(12) United States Patent
Gudem et al.

(10) Patent No.: US 8,995,591 B2
(45) Date of Patent: Mar. 31, 2015

(54) REUSING A SINGLE-CHIP CARRIER AGGREGATION RECEIVER TO SUPPORT NON-CELLULAR DIVERSITY

(71) Applicant: QUALCOMM Incorporated, San Diego, CA (US)

(72) Inventors: Prasad Srinivasa Siva Gudem, San Diego, CA (US); Liang Zhao, Sunnyvale, CA (US); Jin-Su Ko, San Jose, CA (US); Hong Sun Kim, San Jose, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 13/828,417

(22) Filed: Mar. 14, 2013

(65) Prior Publication Data

US 2014/0269853 A1 Sep. 18, 2014

(51) Int. Cl.
H04L 1/02 (2006.01)
H04B 7/02 (2006.01)
H04L 5/00 (2006.01)
H04B 1/00 (2006.01)
H04B 1/18 (2006.01)
H04B 1/40 (2006.01)
H04B 7/04 (2006.01)

(52) U.S. Cl.
CPC .............. *H04B 7/02* (2013.01); *H04L 5/0098* (2013.01); *H04B 1/0064* (2013.01); *H04B 1/18* (2013.01); *H04B 1/40* (2013.01); *H04B 7/04* (2013.01)
USPC ........... 375/347; 375/247; 375/219; 375/220; 375/259; 375/260; 375/267; 375/285; 375/295; 375/299; 375/316; 375/349

(58) Field of Classification Search
USPC ......... 375/347, 219, 220, 259, 260, 267, 285, 375/295, 299, 316, 349
See application file for complete search history.

(56) References Cited

U.S. PATENT DOCUMENTS 3,911,364 A 10/1975 Langseth et al.
4,035,728 A 7/1977 Ishikawa et al.
(Continued)

FOREIGN PATENT DOCUMENTS

CN 1523912 A 8/2004
CN 1922795 A 2/2007
(Continued)

OTHER PUBLICATIONS

3GPP TS 36.101 V11.0.0, 3rd Generation Partnership Project; Technical Specification Group Radio Access Network; Evolved Universal Terrestrial Radio Access (E-UTRA); User Equipment (UE) radio transmission and reception (Release 11), Mar. 2012.
(Continued)

*Primary Examiner* — Siu Lee
(74) *Attorney, Agent, or Firm* — Fountainhead Law Group P.C.

(57) ABSTRACT

A wireless communication device configured for receiving multiple signals is described. The wireless communication device includes a single-chip carrier aggregation receiver architecture. The single-chip carrier aggregation receiver architecture includes a first antenna, a second antenna, a third antenna, a fourth antenna and a transceiver chip. The transceiver chip includes multiple carrier aggregation receivers. The single-chip carrier aggregation receiver architecture reuses at least one of the carrier aggregation receivers for secondary diversity.

62 Claims, 15 Drawing Sheets

(56) References Cited

U.S. PATENT DOCUMENTS

| | | |
|---|---|---|
| 4,035,729 A | 7/1977 | Perry |
| 4,246,655 A | 1/1981 | Parker |
| 4,326,294 A | 4/1982 | Okamoto et al. |
| 4,715,048 A | 12/1987 | Masamura |
| 4,742,563 A | 5/1988 | Fukumura |
| 4,756,023 A | 7/1988 | Kojima |
| 4,969,207 A | 11/1990 | Sakamoto et al. |
| 5,056,411 A | 10/1991 | Baker |
| 5,128,630 A | 7/1992 | Mijuskovic |
| 5,291,519 A | 3/1994 | Tsurumaru |
| 5,321,850 A | 6/1994 | Backstrom et al. |
| 5,345,601 A | 9/1994 | Takagi et al. |
| 5,390,342 A | 2/1995 | Takayama et al. |
| 5,559,838 A | 9/1996 | Nakagoshi |
| 5,566,364 A | 10/1996 | Mizoguchi et al. |
| 5,694,396 A | 12/1997 | Firouzbakht et al. |
| 5,697,083 A | 12/1997 | Sano |
| 5,761,613 A | 6/1998 | Saunders et al. |
| 5,794,159 A | 8/1998 | Portin |
| 5,805,643 A | 9/1998 | Seki et al. |
| 5,805,989 A | 9/1998 | Ushida |
| 5,835,853 A | 11/1998 | Enoki et al. |
| 5,940,452 A | 8/1999 | Rich |
| 5,999,815 A | 12/1999 | TenBrook et al. |
| 5,999,990 A | 12/1999 | Sharrit et al. |
| 6,026,288 A | 2/2000 | Bronner |
| 6,040,732 A | 3/2000 | Brokaw |
| 6,044,254 A | 3/2000 | Ohta et al. |
| 6,063,961 A | 5/2000 | Kroner |
| 6,069,923 A | 5/2000 | Ostman et al. |
| 6,088,348 A | 7/2000 | Bell, III et al. |
| 6,208,844 B1 | 3/2001 | Abdelgany |
| 6,249,687 B1 | 6/2001 | Thomsen et al. |
| 6,424,683 B1 | 7/2002 | Schollhorn |
| 6,430,237 B1 | 8/2002 | Anvari |
| 6,472,947 B1 | 10/2002 | Zeitz |
| 6,473,601 B1 | 10/2002 | Oda |
| 6,522,895 B1 | 2/2003 | Montalvo |
| 6,535,725 B2 | 3/2003 | Hatcher et al. |
| 6,600,759 B1 | 7/2003 | Wood |
| 6,600,907 B1 | 7/2003 | Taguchi |
| 6,600,931 B2 | 7/2003 | Sutton et al. |
| 6,657,498 B2 | 12/2003 | Park et al. |
| 6,806,777 B2 | 10/2004 | Franca-Neto |
| 6,819,941 B2 | 11/2004 | Dening et al. |
| 6,888,888 B1 | 5/2005 | Tu et al. |
| 6,952,594 B2 | 10/2005 | Hendin |
| 6,954,446 B2 | 10/2005 | Kuffner |
| 6,983,132 B2 | 1/2006 | Woo et al. |
| 6,985,712 B2 | 1/2006 | Yamakawa et al. |
| 6,987,950 B2 | 1/2006 | Coan |
| 7,013,166 B2 | 3/2006 | Clifford |
| 7,023,272 B2 | 4/2006 | Hung et al. |
| 7,024,172 B1 | 4/2006 | Murphy et al. |
| 7,039,377 B2 | 5/2006 | Yates |
| 7,123,891 B2 | 10/2006 | Loke |
| 7,142,042 B1 | 11/2006 | Henry |
| 7,161,423 B2 | 1/2007 | Paul et al. |
| 7,167,044 B2 | 1/2007 | Li et al. |
| 7,187,239 B2 | 3/2007 | Yeh |
| 7,187,735 B2 | 3/2007 | Kent, III et al. |
| 7,187,904 B2 | 3/2007 | Gainey et al. |
| 7,212,788 B2 | 5/2007 | Weber et al. |
| 7,224,231 B2 | 5/2007 | Wu |
| 7,260,377 B2 | 8/2007 | Burns et al. |
| 7,283,851 B2 | 10/2007 | Persico et al. |
| 7,299,021 B2 | 11/2007 | Parssinen et al. |
| 7,313,368 B2 | 12/2007 | Wu et al. |
| 7,317,894 B2 | 1/2008 | Hirose |
| 7,333,831 B2 | 2/2008 | Srinivasan et al. |
| 7,356,325 B2 | 4/2008 | Behzad et al. |
| 7,372,336 B2 | 5/2008 | Lee et al. |
| 7,403,508 B1 | 7/2008 | Miao |
| 7,444,166 B2 | 10/2008 | Sahota |
| 7,454,181 B2 | 11/2008 | Banister et al. |
| 7,477,106 B2 | 1/2009 | Van Bezooijen et al. |
| 7,486,135 B2 | 2/2009 | Mu |
| 7,599,675 B2 | 10/2009 | Mu et al. |
| 7,643,847 B2 | 1/2010 | Daanen et al. |
| 7,643,848 B2 * | 1/2010 | Robinett .................... 455/552.1 |
| 7,697,905 B2 | 4/2010 | Lee et al. |
| 7,728,664 B2 | 6/2010 | Chang et al. |
| 7,751,513 B2 | 7/2010 | Eisenhut et al. |
| 7,764,726 B2 | 7/2010 | Simic et al. |
| 7,848,724 B2 | 12/2010 | Bult et al. |
| 7,869,528 B2 | 1/2011 | Robinson |
| 7,877,075 B1 | 1/2011 | Jin et al. |
| 7,911,269 B2 | 3/2011 | Yang et al. |
| 7,944,298 B2 | 5/2011 | Cabanillas et al. |
| 7,949,309 B2 | 5/2011 | Rofougaran et al. |
| 7,952,398 B2 | 5/2011 | Salcido et al. |
| 8,022,772 B2 | 9/2011 | Cassia et al. |
| 8,055,229 B2 | 11/2011 | Huang |
| 8,063,706 B2 | 11/2011 | Li et al. |
| 8,081,672 B2 | 12/2011 | Kent et al. |
| 8,090,332 B2 | 1/2012 | Sahota et al. |
| 8,090,369 B2 | 1/2012 | Kitazoe |
| 8,139,670 B1 | 3/2012 | Son et al. |
| 8,149,955 B2 | 4/2012 | Tired |
| 8,195,117 B2 | 6/2012 | Bult et al. |
| 8,208,887 B2 | 6/2012 | Lee et al. |
| 8,217,723 B2 | 7/2012 | Rajendran et al. |
| 8,242,841 B2 | 8/2012 | Zhang |
| 8,270,927 B2 | 9/2012 | Wallace et al. |
| 8,290,449 B2 | 10/2012 | Keehr et al. |
| 8,295,778 B2 | 10/2012 | Kotecha et al. |
| 8,306,494 B2 | 11/2012 | Ojo |
| 8,442,473 B1 | 5/2013 | Kaukovuori et al. |
| 8,514,015 B2 | 8/2013 | Chen |
| 8,571,510 B2 | 10/2013 | Liu et al. |
| 8,600,315 B2 | 12/2013 | Roufoogaran et al. |
| 8,626,084 B2 | 1/2014 | Chan et al. |
| 8,676,148 B2 | 3/2014 | Ogasawara |
| 8,706,069 B2 | 4/2014 | Khoini-Poorfard et al. |
| 2002/0008575 A1 | 1/2002 | Oskowsky et al. |
| 2002/0061773 A1 | 5/2002 | Adachi et al. |
| 2002/0111163 A1 | 8/2002 | Hamabe |
| 2002/0132597 A1 | 9/2002 | Peterzell et al. |
| 2002/0173337 A1 | 11/2002 | Hajimiri et al. |
| 2002/0193108 A1 | 12/2002 | Robinett |
| 2003/0076797 A1 | 4/2003 | Lozano |
| 2003/0081694 A1 | 5/2003 | Wieck |
| 2003/0125040 A1 | 7/2003 | Walton et al. |
| 2003/0148750 A1 | 8/2003 | Yan et al. |
| 2003/0157915 A1 | 8/2003 | Atkinson et al. |
| 2003/0176176 A1 | 9/2003 | Leinonen et al. |
| 2003/0203743 A1 | 10/2003 | Sugar et al. |
| 2003/0206076 A1 | 11/2003 | Hashemi et al. |
| 2003/0228851 A1 | 12/2003 | Taniguchi |
| 2004/0087290 A1 | 5/2004 | Schmidt et al. |
| 2004/0092243 A1 | 5/2004 | Hey-Shipton |
| 2004/0113746 A1 | 6/2004 | Brindle |
| 2004/0116086 A1 | 6/2004 | Huttunen |
| 2004/0121753 A1 | 6/2004 | Sugar et al. |
| 2004/0204104 A1 | 10/2004 | Horng et al. |
| 2004/0219959 A1 | 11/2004 | Khayrallah et al. |
| 2004/0224643 A1 | 11/2004 | Nakai |
| 2004/0253955 A1 | 12/2004 | Love et al. |
| 2004/0266356 A1 | 12/2004 | Javor et al. |
| 2005/0039060 A1 | 2/2005 | Okayasu |
| 2005/0075077 A1 | 4/2005 | Mach et al. |
| 2005/0079847 A1 | 4/2005 | Arafa |
| 2005/0118977 A1 | 6/2005 | Drogi et al. |
| 2005/0197090 A1 | 9/2005 | Stockstad et al. |
| 2005/0215264 A1 | 9/2005 | Subramaniam et al. |
| 2005/0265084 A1 | 12/2005 | Choi |
| 2005/0277387 A1 | 12/2005 | Kojima et al. |
| 2006/0009177 A1 | 1/2006 | Persico et al. |
| 2006/0061773 A1 | 3/2006 | Lee et al. |
| 2006/0121937 A1 | 6/2006 | Son |
| 2006/0128322 A1 | 6/2006 | Igarashi et al. |
| 2006/0146693 A1 | 7/2006 | Mori et al. |
| 2006/0189286 A1 | 8/2006 | Kyu et al. |
| 2006/0234662 A1 | 10/2006 | Diloisy |

(56) References Cited

U.S. PATENT DOCUMENTS

| | | | |
|---|---|---|---|
| 2006/0291428 A1 | 12/2006 | Filipovic | |
| 2007/0049332 A1 | 3/2007 | Higuchi | |
| 2007/0060080 A1 | 3/2007 | Nishimura et al. | |
| 2007/0072577 A1 | 3/2007 | Rozenblit et al. | |
| 2007/0105517 A1 | 5/2007 | Chang et al. | |
| 2007/0142013 A1 | 6/2007 | Bucknor et al. | |
| 2007/0177656 A1 | 8/2007 | Maruta et al. | |
| 2007/0177693 A1 | 8/2007 | Kluge | |
| 2007/0184801 A1 | 8/2007 | Kogawa et al. | |
| 2007/0197170 A1 | 8/2007 | Boos | |
| 2007/0197178 A1 | 8/2007 | Gu | |
| 2007/0197204 A1 | 8/2007 | Herczog et al. | |
| 2007/0202890 A1 | 8/2007 | Feher | |
| 2007/0242784 A1* | 10/2007 | Sampson et al. | 375/347 |
| 2007/0243832 A1* | 10/2007 | Park et al. | 455/73 |
| 2007/0262817 A1 | 11/2007 | Ciccarelli et al. | |
| 2007/0262871 A1 | 11/2007 | Yamagajo et al. | |
| 2008/0004078 A1 | 1/2008 | Barratt et al. | |
| 2008/0013654 A1 | 1/2008 | Rick et al. | |
| 2008/0117999 A1 | 5/2008 | Kadous et al. | |
| 2008/0139151 A1 | 6/2008 | Ojo et al. | |
| 2008/0204148 A1 | 8/2008 | Kim et al. | |
| 2008/0224770 A1 | 9/2008 | Kim et al. | |
| 2008/0224791 A1 | 9/2008 | Cheng | |
| 2008/0225971 A1 | 9/2008 | Behzad | |
| 2008/0261650 A1 | 10/2008 | Piriyapoksombut et al. | |
| 2009/0124227 A1 | 5/2009 | Ishiguro | |
| 2009/0227214 A1 | 9/2009 | Georgantas et al. | |
| 2009/0237161 A1 | 9/2009 | Fagg | |
| 2009/0243869 A1 | 10/2009 | Sanderford, Jr. | |
| 2009/0253456 A1 | 10/2009 | Toh et al. | |
| 2009/0290659 A1 | 11/2009 | Petrovic et al. | |
| 2009/0323779 A1 | 12/2009 | Lennen | |
| 2010/0019970 A1 | 1/2010 | Farrokhi et al. | |
| 2010/0034094 A1 | 2/2010 | Tenny | |
| 2010/0040178 A1 | 2/2010 | Sutton et al. | |
| 2010/0142440 A1 | 6/2010 | Inoue | |
| 2010/0195754 A1 | 8/2010 | Li et al. | |
| 2010/0197263 A1 | 8/2010 | Dwyer et al. | |
| 2010/0210272 A1 | 8/2010 | Sundstrom et al. | |
| 2010/0210299 A1 | 8/2010 | Gorbachov | |
| 2010/0214184 A1 | 8/2010 | Tran et al. | |
| 2010/0225414 A1 | 9/2010 | Gorbachov | |
| 2010/0226327 A1 | 9/2010 | Zhang et al. | |
| 2010/0232493 A1 | 9/2010 | Thirumoorthy | |
| 2010/0237947 A1 | 9/2010 | Xiong et al. | |
| 2010/0253435 A1 | 10/2010 | Ichitsubo et al. | |
| 2010/0265875 A1 | 10/2010 | Zhao et al. | |
| 2010/0271986 A1 | 10/2010 | Chen | |
| 2010/0272051 A1 | 10/2010 | Fu et al. | |
| 2010/0301946 A1 | 12/2010 | Borremans | |
| 2010/0311378 A1 | 12/2010 | Tasic et al. | |
| 2010/0328155 A1 | 12/2010 | Simic et al. | |
| 2010/0330977 A1 | 12/2010 | Kadous et al. | |
| 2011/0018635 A1 | 1/2011 | Tasic et al. | |
| 2011/0044380 A1 | 2/2011 | Marra et al. | |
| 2011/0050319 A1 | 3/2011 | Wong | |
| 2011/0084791 A1 | 4/2011 | Mun et al. | |
| 2011/0086603 A1 | 4/2011 | Toosi et al. | |
| 2011/0110463 A1 | 5/2011 | Chang et al. | |
| 2011/0122972 A1 | 5/2011 | Lie et al. | |
| 2011/0165848 A1 | 7/2011 | Gorbachov et al. | |
| 2011/0193625 A1 | 8/2011 | Gatta et al. | |
| 2011/0211533 A1 | 9/2011 | Casaccia et al. | |
| 2011/0217945 A1 | 9/2011 | Uehara et al. | |
| 2011/0222443 A1 | 9/2011 | Khlat | |
| 2011/0222444 A1 | 9/2011 | Khlat et al. | |
| 2011/0242999 A1 | 10/2011 | Palanki et al. | |
| 2011/0250926 A1 | 10/2011 | Wietfeldt et al. | |
| 2011/0268048 A1 | 11/2011 | Toskala et al. | |
| 2011/0268232 A1 | 11/2011 | Park et al. | |
| 2011/0292844 A1 | 12/2011 | Kwun et al. | |
| 2011/0299434 A1 | 12/2011 | Gudem et al. | |
| 2011/0300810 A1 | 12/2011 | Mikhemar et al. | |
| 2012/0009886 A1 | 1/2012 | Poulin | |
| 2012/0013387 A1 | 1/2012 | Sankaranarayanan et al. | |
| 2012/0026862 A1 | 2/2012 | Sadri et al. | |
| 2012/0044927 A1 | 2/2012 | Pan et al. | |
| 2012/0056681 A1 | 3/2012 | Lee | |
| 2012/0057621 A1* | 3/2012 | Hong et al. | 375/219 |
| 2012/0195237 A1 | 8/2012 | Chan et al. | |
| 2012/0236829 A1 | 9/2012 | Takano et al. | |
| 2012/0293265 A1 | 11/2012 | Heikkinen et al. | |
| 2012/0294299 A1* | 11/2012 | Fernando | 370/339 |
| 2012/0327825 A1* | 12/2012 | Gudem et al. | 370/310 |
| 2012/0329395 A1* | 12/2012 | Husted et al. | 455/41.2 |
| 2013/0003617 A1 | 1/2013 | Gudem et al. | |
| 2013/0003783 A1 | 1/2013 | Gudem et al. | |
| 2013/0043946 A1 | 2/2013 | Hadjichristos et al. | |
| 2013/0051284 A1* | 2/2013 | Khlat | 370/277 |
| 2013/0114769 A1 | 5/2013 | Fernando | |
| 2013/0217398 A1 | 8/2013 | Winiecki et al. | |
| 2013/0230080 A1 | 9/2013 | Gudem et al. | |
| 2013/0231064 A1 | 9/2013 | Gudem et al. | |
| 2013/0265892 A1 | 10/2013 | Fernando | |
| 2013/0315348 A1 | 11/2013 | Task et al. | |
| 2013/0316668 A1 | 11/2013 | Davierwalla et al. | |
| 2013/0316669 A1 | 11/2013 | Davierwalla et al. | |
| 2013/0316670 A1 | 11/2013 | Task et al. | |
| 2013/0329665 A1 | 12/2013 | Kadous et al. | |
| 2014/0072001 A1 | 3/2014 | Chang et al. | |
| 2014/0113578 A1 | 4/2014 | Xu | |

FOREIGN PATENT DOCUMENTS

| | | |
|---|---|---|
| CN | 101523967 A | 9/2009 |
| CN | 101789805 A | 7/2010 |
| EP | 1164719 A1 | 12/2001 |
| EP | 1370012 | 12/2003 |
| EP | 1398887 A1 | 3/2004 |
| EP | 1708372 A2 | 10/2006 |
| EP | 1726098 A1 | 11/2006 |
| EP | 1748567 A2 | 1/2007 |
| EP | 1761076 A2 | 3/2007 |
| EP | 2068583 A1 | 6/2009 |
| EP | 2141818 A1 | 1/2010 |
| EP | 1916767 B1 | 12/2010 |
| EP | 2393205 A2 | 12/2011 |
| EP | 2398285 A1 | 12/2011 |
| GB | 2472978 A | 3/2011 |
| JP | 05227234 | 9/1993 |
| JP | H0730452 A | 1/1995 |
| JP | 07221684 | 8/1995 |
| JP | 9027778 A | 1/1997 |
| JP | 09116458 | 5/1997 |
| JP | H11127300 A | 5/1999 |
| JP | 2000013278 A | 1/2000 |
| JP | 2001285114 A | 10/2001 |
| JP | 2002261880 A | 9/2002 |
| JP | 2004015162 A | 1/2004 |
| JP | 2007324711 A | 12/2007 |
| JP | 2008519535 A | 6/2008 |
| JP | 2009130867 A | 6/2009 |
| JP | 2011015112 A | 1/2011 |
| JP | 2011082669 A | 4/2011 |
| JP | 2011119807 A | 6/2011 |
| WO | WO-0150636 | 7/2001 |
| WO | WO-2005039060 | 4/2005 |
| WO | WO-2005088847 A1 | 9/2005 |
| WO | 2006050515 A2 | 5/2006 |
| WO | WO-2006118538 A2 | 11/2006 |
| WO | 2008084539 A1 | 7/2008 |
| WO | WO-2008092745 A1 | 8/2008 |
| WO | WO-2008103757 | 8/2008 |
| WO | WO-2008145604 A1 | 12/2008 |
| WO | WO-2010059257 A1 | 5/2010 |
| WO | WO-2011019850 A1 | 2/2011 |
| WO | WO-2011050729 A1 | 5/2011 |
| WO | WO-2011092005 A1 | 8/2011 |
| WO | WO-2011138697 A1 | 11/2011 |
| WO | WO-2012008705 A2 | 1/2012 |
| WO | 2012049529 A1 | 4/2012 |

(56) References Cited

FOREIGN PATENT DOCUMENTS

| WO | WO-2013036794 A1 | 3/2013 |
|---|---|---|
| WO | 2013131047 | 9/2013 |

OTHER PUBLICATIONS

Aparin et al., "A Highly-integrated tri-band/quad-mode SiGe BiCMOS RF-to-baseband and receiver for wireless CDMA/WCDMA/AMPS applications with GPS capability", Solid-State Circuits Conference, 2002. Digest of Technical Papers. 2002 IEEE International Feb. 3-7, 2002, Piscataway, NJ, USA, IEEE, vol. 1, 2002, pp. 234-235, XP010585547, ISBN: 0-7803-7335-9.

Broyde F., et al., "The Noise Performance of aMultiple-Input-Port and Multiple-Output-Port Low-Noise Amplifier Connected to an Array of Coupled Antennas," International Journal of Antennas and Propagation, vol. 2011, Article ID 438478, Jul. 18, 2011, 12 pages.

Chen, et al, "A 5-6 GHz 1-V CMOS Direct-Conversion Receiver With an Integrated Quadrature Coupler," IEEE Journal of Solid-State Circuits, vol. 42, No. 9, 2007, pp. 1963-1975.

Chen, et al., "A monolithic 5.9-GHz CMOS I/Q direct-down converter utilizing a quadrature coupler and transformer-coupled subharmonic mixers," Microwave and Wireless Components Letters, IEEE, vol. 16, No. 4, 2006, pp. 197-199.

Garuda, et al., "A Multi-band CMOS RF Front-end for 4G WiMAX and WLAN Applications," 2006 IEEE International Symposium on Circuits and Systes, 2006. ISCAS 2006. May 2006, 4 pages.

Hashemi, et al., "Concurrent Multiband Low-Noise Amplifiers—Theory, Design, and Applications," IEEE Transactions on Microwave Theory and Techniques, vol. 50, No. 1, Jan. 2002.

Henrik M et al., "A Full Duplex Front End Module for WiFi 802.11.n Applications", European Microwave Association, vol. 12, No. 4, Oct. 2008, pp. 162-165.

Hwang, et al., "A High IIP2 Direct-Conversion Receiver using Even-Harmonic Reduction Technique for Cellular CDMA/PCA/GPS applications," IEEE Transactions on Circuits and Systems, 2008.

Jones W. W., et al., "Narrowband interference suppression using filter-bank analysis/synthesis techniques", Military Communications Conference, 1992. MILCOM '92, Conference RECOR D. Communications—Fusing Command, Control and Intelligence., IEEE San Diego, CA, USA, Oct. 11, 14, 1992, New York, NY, USA, IEEE, US, Oct. 11, 1992, pp. 898-902, XP010060840, DOI: 10.1109/MILCOM.1992.243977, ISBN: 978-0-7803-0585-4.

Jussi R et al., "Dual-Band RF Front-End for WCDMA and GSM Applications"; IEEE, Journal Solid-State Circuits, 2001, vol. 36, No. 8, pp. 1198-1204.

Kevin W et al., "3G/4G Multimode Cellular Front End Challenges", Part 2: Architecture Discussion, RFMD® White Paper, 2009, 9 pages.

Kim, T.W., et al., Highly Linear Receiver Front-End Adopting MOSFET Transconductance Linearization by Multiple Gated Transistor, IEEE Journal of Solid-State Circuits, United States, IEEE, Jan. 1, 2004, vol. 39, No. 1, pp. 223-229.

Lai, C.M.,et al., "Compact router transceiver architecture for carrier aggregation systems", Microwave Conference (EUMC), 2011 41st European, IEEE, Oct. 10, 2011, pp. 693-696, XP032072825, ISBN: 978-1-61284-235-6 the whole document.

Lee et al., "Developement of Miniature Quad SAW filter bank based on PCB substrate", IEEE Intl Frequency Control Symp, pp. 146-149, 2007.

MSM6000 Chipset Solution, Qualcomm Incorporated, 2003.

MSM6500 Chipset Solution, Qualcomm Incorporated, 2004.

Philips: "Capabilities of multi-transceiver UES", 3GPP Draft; R1-103913, 3rd Generation Partnership Project (3GPP), Mobile Competence Centre; 650, Route Des Lucioles; F-06921 Sophia-Antipolis Cedex; France, vol. RAN WG1, no. Dresden, Germany; 20100628, Jun. 22, 2010, XP050449298, [retrieved on Jun. 22, 2010] the whole document.

Pitschi M. et al., "High Performance Microwave Acoustic Components for Mobile Radios", Ultrasonics Symposium (IUS), 2009 IEEE International, EPCOS AG, Munich, Germany, vol. 1, Sep. 20-23, 2009.

Qualcomm Europe: "UE Implementation Impact due to 4C-HSDPA Operation", 3GPP Draft; R1-094067_UE_IMPL_Impact_4C_HSDPA, 3rd Generation Partnership Project (3GPP), Mobile Competence Centre; 650, Route Des Lucioles; F-06921 Sophia-Antipolis Cedex ; France, no. Miyazaki; 20091012, Oct. 12, 2009, XP050388547, [retrieved on Oct. 6, 2009].

Rahn D.G., et al., "A fully integrated multiband MIMO WLAN transceiver RFIC," IEEE J. Solid-State Circuits, 2005, vol. 40 (8), 1629-1641.

Sever et al. "A Dual-Antenna Phase-Array Ultra-Wideband CMOS Transceiver". IEEE Communications Magazine [Online] 2006, vol. 44, Issue 8, pp. 102-110. See pp. 104-107.

Tasic A. et al., "Design of Adaptive Multimode RF Front-End Circuits", IEEE Journal of Solid-State Circuits, vol. 42, Issue 2, Feb. 2007 pp. 313-322.

"UMTS Picocell Front End Module", CTS Corp., 2007, 8 pages.

Winternitz, et al., "A GPS Receiver for High-Altitude Satellite Navigation," IEEE Journal of Selected Topics in Signal Processing, vol. 3, No. 4, pp. 541-556, Aug. 2009.

International Search Report and Written Opinion—PCT/US2014/022773—ISA/EPO—Jul. 1, 2014.

\* cited by examiner

REUSING A SINGLE-CHIP CARRIER AGGREGATION RECEIVER TO SUPPORT NON-CELLULAR DIVERSITY

TECHNICAL FIELD

The present disclosure relates generally to wireless devices for communication systems. More specifically, the present disclosure relates to systems and methods for a reusing a single-chip carrier aggregation receiver to support non-cellular diversity.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

These electronic devices may communicate wirelessly with each other and with a network. As the demand for information by these electronic devices has increased, the downlink throughput, as well as desired functionality, has also increased.

It may be desirable for an electronic device to maximize battery life. Because an electronic device often runs on a battery with a limited operation time, reductions in the power consumption of an electronic device may increase the desirability and functionality of the electronic device.

Electronic devices have also become smaller and cheaper. To facilitate both decrease in size and decrease in cost, additional circuitry and more complex circuitry are being used on integrated circuits. Thus, any reduction in the die area used by circuitry may reduce both the size and cost of an electronic device. Benefits may be realized by improvements to electronic devices that allow an electronic device to participate in reuse circuitry while minimizing the cost, size and/or power consumption of the electronic device.

SUMMARY

A wireless communication device configured for receiving multiple signals is described. The wireless communication device includes a single-chip carrier aggregation receiver architecture. The single-chip carrier aggregation receiver architecture includes a first antenna, a second antenna, a third antenna, a fourth antenna and a transceiver chip. The transceiver chip includes multiple carrier aggregation receivers. The single-chip carrier aggregation receiver architecture reuses at least one of the carrier aggregation receivers for secondary diversity.

The multiple carrier aggregation receivers may include a first receiver, a second receiver, a third receiver, and a fourth receiver. The transceiver chip may include a transmitter and a fifth receiver. The multiple carrier aggregation receivers may each include multiple low noise amplifiers. The fifth receiver may also include multiple low noise amplifiers.

The fifth receiver may be a non-carrier aggregation receiver, a non-simultaneous hybrid dual receiver, a global navigation satellite system receiver, a Bluetooth receiver or a Wi-Fi receiver.

A first secondary routing may be used from the third antenna through the fourth receiver to obtain a fourth Rx inphase/quadrature signal. A second secondary routing may be used from the fourth antenna through the fifth receiver to obtain a fifth Rx inphase/quadrature signal. The first secondary routing may pass through a first 4Rx low noise amplifier. The second secondary routing may pass through a first 5Rx low noise amplifier and a second 5Rx low noise amplifier.

The first receiver may include a first mixer. The second receiver may include a second mixer. The third receiver may include a third mixer. The fourth receiver may include a fourth mixer. The fifth receiver may include a fifth mixer.

The first secondary routing may pass through the fourth mixer. The fourth mixer may be driven by a voltage controlled oscillator on the second receiver and/or by a voltage controlled oscillator on the fifth receiver.

The wireless communication device may include a sixth mixer on the fourth receiver or the fifth receiver. The sixth mixer may be driven by a voltage controlled oscillator on the fifth receiver.

The first secondary routing may pass through a first 5RX low noise amplifier. The second secondary routing may pass through a second 5RX low noise amplifier.

The fourth Rx inphase/quadrature signal and the fifth Rx inphase/quadrature signal may pass through a baseband digital modem. The baseband digital modem may include a first analog-to-digital converter, a first baseband processor, a controller, a second analog-to-digital converter, a digital front end and a sample memory.

The first analog-to-digital converter may be a global navigation satellite system analog-to-digital converter. The controller may be a global navigation satellite system controller. The second analog-to-digital converter may be a wireless wideband area network analog-to-digital converter. The digital front end may be a wireless wideband area network digital front end. The sample memory may be a wideband area network sample memory.

The fourth Rx inphase/quadrature signal may pass through the first analog-to-digital converter, the first baseband processor and the controller. The fifth Rx inphase/quadrature signal may pass through the second analog-to-digital converter, the digital front end and the sample memory. The fifth Rx inphase/quadrature signal may pass through a third analog-to-digital converter, a second baseband processor and the controller.

The third analog-to-digital converter may be a global navigation satellite system analog-to-digital converter. The fourth Rx inphase/quadrature signal may pass through the first analog-to-digital converter, the first baseband processor and the controller. The fifth Rx inphase/quadrature signal may pass through the second analog-to-digital converter, the digital front end and the sample memory. The fifth Rx inphase/quadrature signal may pass through the second analog-to-digital converter, a second baseband processor and the controller.

The fourth Rx inphase/quadrature signal may pass through the first analog-to-digital converter, the first baseband processor and the controller. The fifth Rx inphase/quadrature signal may pass through the second analog-to-digital converter, the digital front end and the sample memory. The fifth Rx inphase/quadrature signal may pass through the second analog-to-digital converter, the digital front end, a second baseband processor and the controller.

The baseband digital modem may include a first analog-to-digital converter, a first digital front end, a controller, a second analog-to-digital converter, a second digital front end and a sample memory. The first analog-to-digital converter may be a wireless wideband area network analog-to-digital converter. The first digital front end may be a wireless wideband area network digital front end. The controller may be a wireless wideband area network controller. The second analog-to-digital converter may be a wireless wideband area network analog-to-digital converter. The second digital front end may be a wireless wideband area network digital front end. The sample memory may be a wideband area network sample memory.

The fourth Rx inphase/quadrature signal may pass through the first analog-to-digital converter, the first digital front end and the controller. The fifth Rx inphase/quadrature signal may pass through the second analog-to-digital converter, the second digital front end and the sample memory. In another configuration, the fifth Rx inphase/quadrature signal may pass through a third analog-to-digital converter, a third digital front end and the controller. In yet another configuration, the fifth Rx inphase/quadrature signal may pass through the second analog-to-digital converter, a third digital front end and the controller. The fifth Rx inphase/quadrature signal may pass through the second analog-to-digital converter, the second digital front end and the controller.

A method for receiving multiple signals using a single-chip carrier aggregation receiver architecture that includes a first antenna, a second antenna, a third antenna and a fourth antenna is also described. A first secondary signal is received using the third antenna. The first secondary signal is routed through a fourth receiver on a transceiver chip in the single-chip carrier aggregation receiver architecture. The fourth receiver is one of multiple carrier aggregation receivers. The fourth receiver is reused for secondary diversity. A second secondary signal is received using the fourth antenna. The second secondary signal is routed through a fifth receiver on a transceiver chip in the single-chip carrier aggregation receiver architecture.

A computer-program product for receiving multiple signals using a single-chip carrier aggregation receiver architecture that includes a first antenna, a second antenna, a third antenna and a fourth antenna is described. The computer-program product includes a non-transitory computer-readable medium with instructions thereon. The instructions include code for causing a wireless communication device to receive a first secondary signal using the third antenna. The instructions also include code for causing the wireless communication device to route the first secondary signal through a fourth receiver on a transceiver chip in the single-chip carrier aggregation receiver architecture. The fourth receiver is one of multiple carrier aggregation receivers. The fourth receiver is reused for secondary diversity. The instructions further include code for causing the wireless communication device to receive a second secondary signal using the fourth antenna. The instructions also include code for causing the wireless communication device to route the second secondary signal through a fifth receiver on a transceiver chip in the single-chip carrier aggregation receiver architecture.

An apparatus for receiving multiple signals using a single-chip carrier aggregation receiver architecture that includes a first antenna, a second antenna, a third antenna and a fourth antenna is also described. The apparatus includes means for receiving a first secondary signal using the third antenna. The apparatus also includes means for routing the first secondary signal through a fourth receiver on a transceiver chip in the single-chip carrier aggregation receiver architecture. The fourth receiver is one of multiple carrier aggregation receivers. The fourth receiver is reused for secondary diversity. The apparatus further includes means for receiving a second secondary signal using the fourth antenna. The apparatus also includes means for routing the second secondary signal through a fifth receiver on a transceiver chip in the single-chip carrier aggregation receiver architecture.

DETAILED DESCRIPTION

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE).

3GPP specifications are based on evolved Global System for Mobile Communications (GSM) specifications, which are generally known as the Universal Mobile Telecommunications System (UMTS). 3GPP standards are structured as releases. Discussion of 3GPP thus frequently refers to the functionality in one release or another. For example, Release 99 specifies the first UMTS third generation (3G) networks, incorporating a CDMA air interface. Release 6 integrates operation with wireless local area networks (LAN) networks and adds High Speed Uplink Packet Access (HSUPA). Release 8 introduces dual downlink carriers and Release 9 extends dual carrier operation to uplink for UMTS.

CDMA2000 is a family of $3^{rd}$ generation (3G) technology standards that use code division multiple access (CDMA) to send voice, data and signaling between wireless devices. CDMA2000 may include CDMA2000 1X, CDMA2000 EV-DO Rev. 0, CDMA2000 EV-DO Rev. A and CDMA2000 EV-DO Rev. B. 1x or 1xRTT refers to the core CDMA2000 wireless air interface standard. 1x more specifically refers to 1 times Radio Transmission Technology and indicates the same radio frequency (RF) bandwidth as used in IS-95. 1xRTT adds 64 additional traffic channels to the forward link. EV-DO refers to Evolution-Data Optimized. EV-DO is a telecommunications standard for the wireless transmission of data through radio signals.

Figure 1:
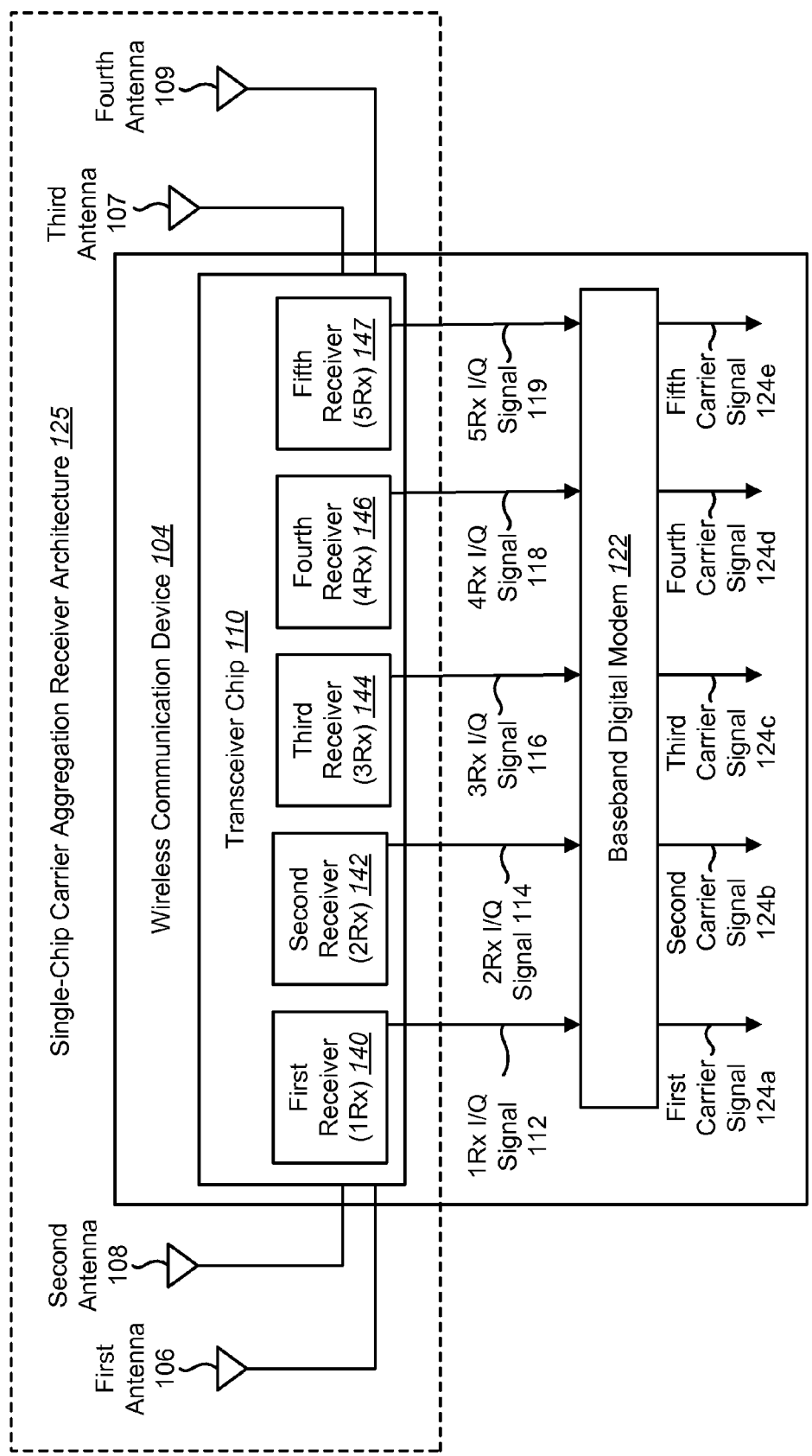
FIG. 1 shows a wireless communication device for use in the present systems and methods.

FIG. 1 shows a wireless communication device 104 for use in the present systems and methods. A wireless communication device 104 may also be referred to as, and may include some or all of the functionality of, a terminal, an access terminal, a user equipment (UE), a subscriber unit, a station, etc. A wireless communication device 104 may be a cellular phone, a personal digital assistant (PDA), a wireless device, a wireless modem, a handheld device, a laptop computer, a PC card, compact flash, an external or internal modem, a wireline phone, etc. A wireless communication device 104 may be mobile or stationary. A wireless communication device 104 may communicate with zero, one or multiple base stations on a downlink and/or an uplink at any given moment. The downlink (or forward link) refers to the communication link from a base station to a wireless communication device 104 and the uplink (or reverse link) refers to the communication link from a wireless communication device 104 to a base station. Uplink and downlink may refer to the communication link or to the carriers used for the communication link.

A wireless communication device 104 may operate in a wireless communication system that includes other wireless devices, such as base stations. A base station is a station that communicates with one or more wireless communication devices 104. A base station may also be referred to as, and may include some or all of the functionality of, an access point, a broadcast transmitter, a Node B, an evolved Node B, etc. Each base station provides communication coverage for a particular geographic area. A base station may provide communication coverage for one or more wireless communication devices 104. The term "cell" can refer to a base station and/or its coverage area, depending on the context in which the term is used.

The wireless communication device 104 may include a first antenna 106, a second antenna 108, a third antenna 107 and a fourth antenna 109. In some configurations, the fourth antenna 109 may be a dedicated antenna for sending and/or receiving data on a third band. For example, the fourth antenna 109 may be a dedicated global positioning system (GPS) or Wi-Fi antenna. In some configurations, the third antenna 107 may also be used for sending and/or receiving data on a third band when not used for carrier aggregation. In this manner, the third antenna 107 and the fourth antenna 109 may be used to achieve diversity of the third band. As used herein, diversity refers to using two or more antennas to improve the quality and reliability of a wireless link. For example, if a third band is a Wi-Fi band, then secondary diversity refers to improving the quality and reliability of the Wi-Fi signal by using both the third antenna 107 and the fourth antenna 109 to receive the Wi-Fi signal.

Communications in a wireless communication system (e.g., a multiple-access system) may be achieved through transmissions over a wireless link. Such a communication link may be established via a single-input and single-output (SISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. SISO systems are particular instances of a multiple-input and multiple-output (MIMO) system. The multiple-input and multiple-output (MIMO) system can provide improved performance (e.g., higher throughput, greater capacity or improved reliability) if the additional dimensionalities created by the multiple transmit and receive antennas are utilized.

The wireless communication system may utilize both single-input and multiple-output (SIMO) and multiple-input and multiple-output (MIMO). The wireless communication system may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

A transceiver chip 110 may be coupled to the first antenna 106, the second antenna 108, the third antenna 107 and the fourth antenna 109. The transceiver chip 110 may include a transmitter and multiple carrier aggregation receivers. The multiple carrier aggregation receivers may include a first receiver (1Rx) 140, a second receiver (2Rx) 142, a third receiver (3Rx) 144 and a fourth receiver (4Rx) 146. The transceiver chip 110 may include a secondary transmitter and a fifth receiver (5Rx) 147.

When operating in non-simultaneous hybrid dual receiver (SHDR) mode and/or non-carrier aggregation mode, the third receiver (3Rx) 144 and/or fourth receiver (4Rx) 146 may be idle. In other words, the third receiver (3Rx) 144 and/or fourth receiver (4Rx) 146 may be unused for non-simultaneous hybrid dual receiver (SHDR) operation and/or non-carrier aggregation operation of the wireless communication device 104. In this case, the third receiver (3Rx) 144 and/or fourth receiver (4Rx) 146 may be reused for secondary diversity. By using the third receiver (3Rx) 144 and/or fourth receiver (4Rx) 146 for secondary diversity, the wireless communication device 104 may be able to employ secondary diversity of a third band (e.g., a non-cellular band) without requiring an additional antenna or circuitry. By using additional antennas and/or receivers for the third band, the multiple-input and multiple-output (MIMO) capabilities of the third band may be expanded. In other words, the quality and reliability of the third band may be improved. For example, if the third band corresponds to global positioning system (GPS) or Wi-Fi, reusing the third antenna 107 along with the corresponding fourth receiver (4Rx) 146, in addition to the fourth antenna 109 and corresponding fifth receiver (5Rx) 147, will increase the multiple-input and multiple-output (MIMO) capabilities of the global positioning system (GPS) or Wi-Fi.

In some configurations, the first antenna 106 may be a primary antenna and the first receiver (1Rx) 140 may be a primary receiver. The second antenna 108 may be a secondary antenna and the second receiver (2Rx) 142 may be a secondary receiver. The third antenna 107 may be a tertiary antenna and the third receiver (3Rx) 144 may be a tertiary receiver. The fourth antenna 109 may be a quaternary antenna and the fourth receiver (4Rx) 146 may be a quaternary receiver. The fifth receiver (5Rx) 147 may be a secondary receiver. For example, the fifth receiver (5Rx) 147 may be a non-simultaneous hybrid diversity receiver (SHDR) receiver, a non-carrier aggregation receiver or another type of non-cellular technology receiver. For instance, the fifth receiver (5Rx) 147 may be a global navigation satellite system (GNSS), global positioning system (GPS), Wi-Fi (e.g., wireless local area network (WLAN)) or Bluetooth receiver.

The first receiver (1Rx) 140 of the transceiver chip 110 may output a 1Rx inphase/quadrature (I/Q) signal 112 to a baseband digital modem 122 on the wireless communication device 104. The second receiver (2Rx) 142 of the transceiver chip 110 may output a 2Rx inphase/quadrature (I/Q) signal 114 to the baseband digital modem 122. The third receiver (3Rx) 144 of the transceiver chip 110 may output a 3Rx inphase/quadrature (I/Q) signal 116 to the baseband digital modem 122. The fourth receiver (4Rx) 146 of the transceiver chip 110 may output a 4Rx inphase/quadrature (I/Q) signal 118 to the baseband digital modem 122. The 1Rx inphase/quadrature (I/Q) signal 112, 2Rx inphase/quadrature (I/Q) signal 114, 3Rx inphase/quadrature (I/Q) signal 116 and 4Rx inphase/quadrature (I/Q) signal 118 may correspond to carrier aggregation signals.

The fifth receiver (5Rx) 147 of the transceiver chip 110 may output a 5Rx inphase/quadrature (I/Q) signal 119 to the baseband digital modem 122. The 5Rx inphase/quadrature (I/Q) signal 119 may correspond to a secondary signal. In some configurations, such as in secondary diversity mode, the 5Rx inphase/quadrature (I/Q) signal 119 may be referred to as a secondary signal.

In some configurations, the wireless communication device 104 may use a single-chip carrier aggregation receiver architecture 125 that reuses one or more of the carrier aggregation receivers (e.g., the third receiver (3Rx) 144 and fourth receiver (4Rx) 146) for secondary diversity. Secondary diversity may include the single-chip carrier aggregation receiver architecture 125 operating in non-simultaneous hybrid dual receiver (SHDR) mode and/or non-carrier aggregation mode. In this manner, the single-chip carrier aggregation receiver architecture 125 may be reused to improve the quality and reliability of receiving and processing the secondary signal. For example, if a secondary signal is a Wi-Fi band, then secondary diversity may improve the quality and reliability of the Wi-Fi signal by reusing parts of the transceiver chip 110 to receive the Wi-Fi signal.

The baseband digital modem 122 may perform processing on the 1Rx inphase/quadrature (I/Q) signal 112, the 2Rx inphase/quadrature (I/Q) signal 114, the 3Rx inphase/quadrature (I/Q) signal 116, the 4Rx inphase/quadrature (I/Q) signal 118 and the 5Rx inphase/quadrature (I/Q) signal 119. For example, the baseband digital modem 122 may convert the signals to the digital domain using analog-to-digital converters (ADCs) and perform digital processing on the signals using digital signal processors (DSPs). The baseband digital modem 122 may then output a first carrier signal 124a, a second carrier signal 124b, a third carrier signal 124c, a fourth carrier signal 124d and a fifth carrier signal 124e. A carrier signal 124 may refer to the carrier that the signal used.

In one configuration, the first carrier signal 124a and the second carrier signal 124b may be located in a low band while the third carrier signal 124c and the fourth carrier signal 124d are located within a midband. This may be referred to as inter-band operation or Dual-Band 4-Carrier according to Rel-10. In another configuration, the first carrier signal 124a, second carrier signal 124b, third carrier signal 124c and fourth carrier signal 124d may all be located within a single band, such as the low band. This may be referred to as intra-band operation or Single-Band 4-Carrier in Release-10. In some configurations the fifth carrier signal 124e may be located within a third band. For example, the third band may be a global navigation satellite system (GNSS), a global positioning system (GPS) or a Wi-Fi band.

Figure 2:
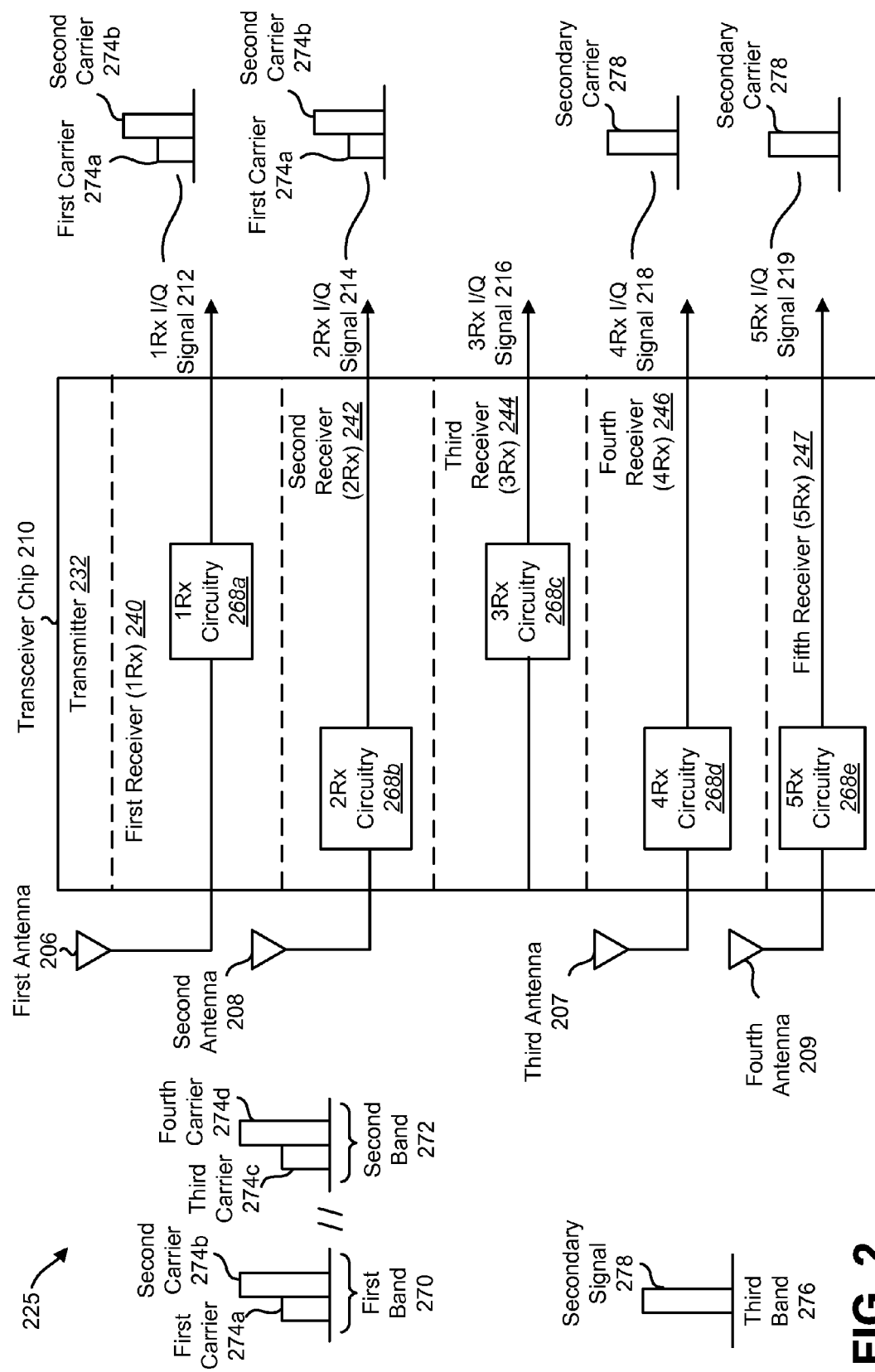
FIG. 2 is a block diagram illustrating a single-chip carrier aggregation receiver architecture operating in inter-band mode.

FIG. 2 is a block diagram illustrating a single-chip carrier aggregation receiver architecture 225. The single-chip carrier aggregation receiver architecture 225 of FIG. 2 may be one configuration of the single-chip carrier aggregation receiver architecture 125 of FIG. 1. The single-chip carrier aggregation receiver architecture 225 may include a first antenna 206, a second antenna 208, a third antenna 207, a fourth antenna 209 and a transceiver chip 210. The first antenna 206 and the second antenna 208 may be used to receive a dual-band 4-carrier signal (i.e., four carriers 274a-d over a first band 270 and a second band 272 (the first band 270 and the second band 272 are separated from each other)).

The transceiver chip 210 may include a transmitter 232, a first receiver (1Rx) 240, a second receiver (2Rx) 242, a third receiver (3Rx) 244, a fourth receiver (4Rx) 246 and a fifth (5Rx) receiver 247. The first antenna 206 may be coupled to 1Rx circuitry 268a of the first receiver (1Rx) 240. The 1Rx circuitry 268a may include 1Rx low noise amplifiers (LNAs), downconverting circuitry and a 1Rx baseband filter (BBF). The 1Rx circuitry 268a may output a 1Rx inphase/quadrature (I/Q) signal 212 that includes the first carrier 274a and the second carrier 274b in the first band 270. As used herein, source low noise amplifier (LNA) refers to a low noise amplifier (LNA) from which a signal routing is taken and target low noise amplifier (LNA) refers to a low noise amplifier (LNA) to which the signal routing is directed.

The second antenna 208 may be coupled to 2Rx circuitry 268b of the second receiver (2Rx) 242. The 2Rx circuitry 268b may include 2Rx low noise amplifiers (LNAs), downconverting circuitry and a 2Rx baseband filter (BBF). The 2Rx circuitry 268b may output a 2Rx inphase/quadrature (I/Q) signal 214 that includes the first carrier 274a and the second carrier 274b in the first band 270.

In some configurations, the third antenna 207 may be coupled to 4Rx circuitry 268d of the fourth receiver (4Rx) 246. The 4Rx circuitry 268d may include 4Rx low noise amplifiers (LNAs), downconverting circuitry and a 4Rx baseband filter (BBF). The 4Rx circuitry 268d may output a 4Rx inphase/quadrature (I/Q) signal 218 that includes the secondary signal 278 in the third band 276. In other configurations, the fourth receiver (4Rx) 246 is idle and not used for carrier aggregation.

In some configurations, the third antenna 207 may be used to receive a secondary signal 278 (i.e., a secondary signal 278 over a third band 276). For example, the third antenna 207 may receive a first secondary signal. For instance, the third band 276 may be a global navigation satellite system (GNSS) band, a global positioning system (GPS) band, a Wi-Fi band or some other type of band. In this configuration, the 4Rx circuitry 268d may output a 4Rx inphase/quadrature (I/Q) signal 218 that includes the secondary signal 278 in the third band 276.

The fourth antenna 209 may be used to receive a secondary signal 278. For example, the fourth antenna 209 may also receive the secondary signal 278 (e.g., a second secondary signal 278). The fourth antenna 209 may be coupled to 5Rx circuitry 268e of the fifth receiver (5Rx) 247. The 5Rx circuitry 268e may include 5Rx low noise amplifiers (LNAs), downconverting circuitry and a 5Rx baseband filter (BBF). The 5Rx circuitry 268e may output a 5Rx inphase/quadrature (I/Q) signal 219 that includes the secondary signal 278 in the third band 276.

In some configurations, the third antenna 207 may be used to receive one type of secondary signal 278, such as a global positioning system (GPS) signal, while the fourth antenna 209 may be used to receive another type of secondary signal 278, such as a Wi-Fi signal. Thus, in this configuration, the idle fourth receiver (4Rx) 246 may be used to achieve one type of non-cellular secondary diversity, while the fifth receiver (5Rx) 247 may be used to achieve another type of non-cellular secondary diversity.

Figure 3:
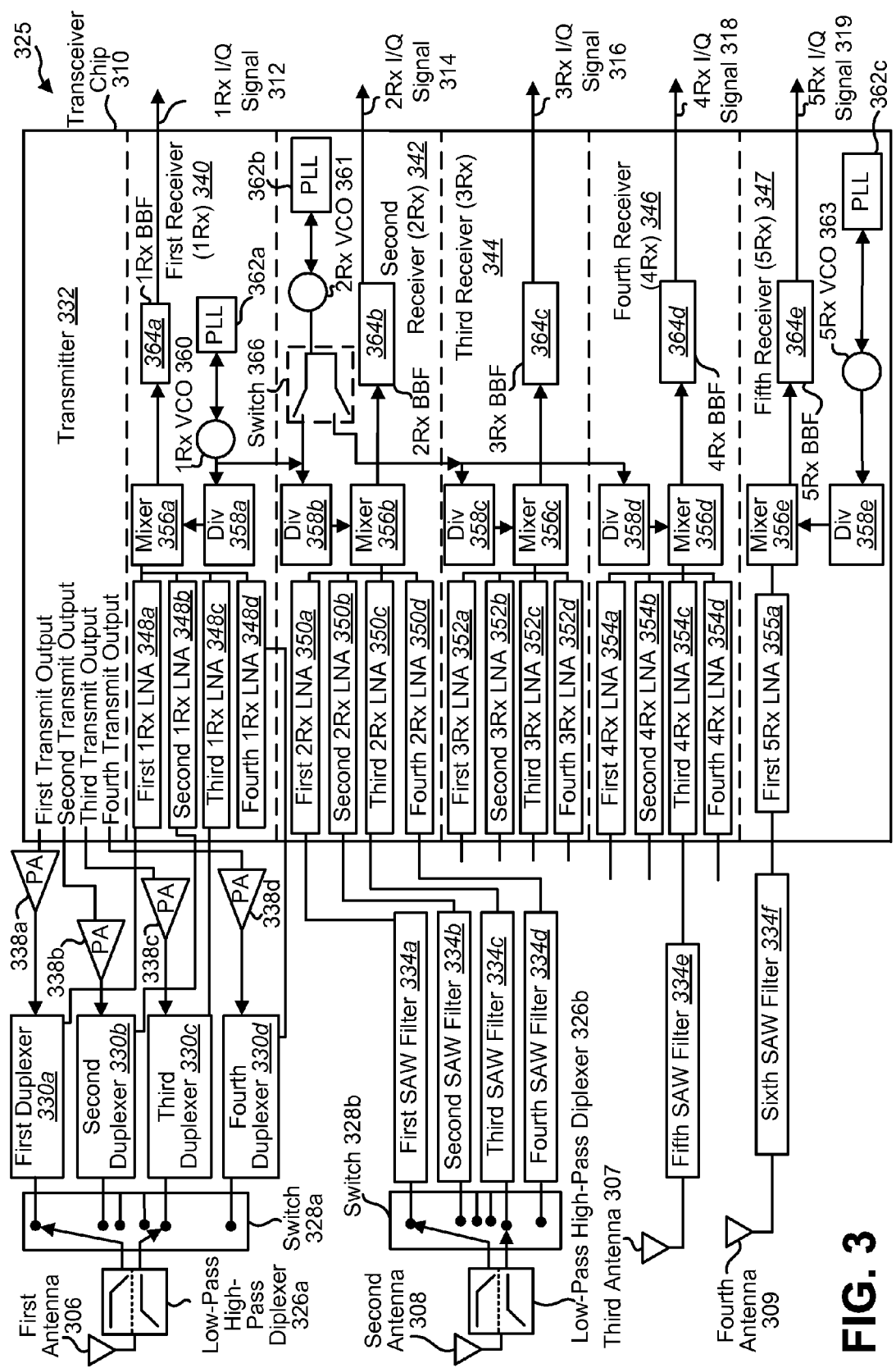
FIG. 3 is a block diagram illustrating a single-chip carrier aggregation receiver architecture.

FIG. 3 is a block diagram illustrating a single-chip carrier aggregation receiver architecture 325. The single-chip carrier aggregation receiver architecture 325 of FIG. 3 may be one configuration of the single-chip carrier aggregation receiver architecture 125 of FIG. 1. The single-chip carrier aggregation receiver architecture 325 may include a first antenna 306, a first low-pass high-pass dipiexer 326a, a first switch 328a, four duplexers 330a-d, a second antenna 308, a second low-pass high-pass dipiexer 326b, a second switch 328b, six surface acoustic wave (SAW) filters 334a-f, a third antenna 307, a fourth antenna 309 and a transceiver chip 310.

The first antenna 306 may be coupled to the first low-pass high-pass diplexer 326a. A low-pass high-pass diplexer 326 may bundle low band frequencies into one signal and high band (or midband) frequencies into another signal, thus allowing the first antenna 306 to pass both low band and midband signals to the transceiver chip 310. The first low-pass high-pass diplexer 326a may be coupled to the first switch 328a. The first switch 328a may have two inputs (the signal that includes the bundled low band frequencies and the signal that includes the bundled high band frequencies) and multiple outputs. In one configuration, the first switch 328a may have six possible outputs to the four duplexers 330 (representing the six possible configurations of duplexer 330 pairs). The four duplexers 330 may include a first duplexer 330a, a second duplexer 330b, a third duplexer 330c and a fourth duplexer 330d. In one configuration, the first duplexer 330a and the second duplexer 330b may be used for a low band while the third duplexer 330c and the fourth duplexer 330d are used for a midband.

The transceiver chip 310 may include a transmitter 332 and carrier aggregation receivers. The carrier aggregation receivers may include a first receiver (1Rx) 340, a second receiver (2Rx) 342, a third receiver (3Rx) 344 and a fourth receiver (4Rx) 346. The transceiver chip 310 may also include a fifth receiver (5Rx) 347. The fifth receiver (5Rx) 347 may be a primary receiver for a secondary signal 278. It should be noted that the transceiver chip 310 may include a second transmitter (not shown) for transmitting on the third band 276. The secondary transmitter may function similarly to the transmitter 332 described below or other types of transmitters known in the art. However, for the purpose of simplicity, the secondary transmitter is not shown in FIG. 3. The secondary transmitter may correspond to Wi-Fi, Bluetooth or another type on non-cellular technology.

The transmitter 332 may include four transmit outputs: a first transmit output, a second transmit output, a third transmit output and a fourth transmit output. In one configuration, the first transmit output and the second transmit output may be first band outputs while the third transmit output and the fourth transmit output may be second band outputs. In another configuration, the third transmit output and/or the fourth transmit output may be third band outputs.

The first transmit output may be coupled to the first duplexer 330a via a power amplifier (PA) 338a. The second transmit output may be coupled to the second duplexer 330b via a power amplifier 338b. The third transmit output may be coupled to the third duplexer 330c via a power amplifier 338c. The fourth transmit output may be coupled to the fourth duplexer 330d via a power amplifier 338d.

The first receiver (1Rx) 340 may include a first 1Rx low noise amplifier (LNA) 348a coupled to the first duplexer 330a, a second 1Rx low noise amplifier (LNA) 348b coupled to the second duplexer 330b, a third 1Rx low noise amplifier (LNA) 348c coupled to the third duplexer 330c and a fourth 1Rx low noise amplifier (LNA) 348d coupled to the fourth duplexer 330d. In one configuration, the first 1Rx low noise amplifier (LNA) 348a and the second 1Rx low noise amplifier (LNA) 348b may be low band low noise amplifiers (LNAs) while the third 1Rx low noise amplifier (LNA) 348c and the fourth 1Rx low noise amplifier (LNA) 348d are midband low noise amplifiers (LNAs).

In another configuration, the first 1Rx low noise amplifier (LNA) 348a and the second 1Rx low noise amplifier (LNA) 348b may be first band 270 low noise amplifiers (LNAs) while the third 1Rx low noise amplifier (LNA) 348c and the fourth 1Rx low noise amplifier (LNA) 348d are second band 272 low noise amplifiers (LNAs). The first 5Rx low noise amplifier (LNA) 355a may be third band 276 low noise amplifiers (LNAs).

The first receiver (1Rx) 340 may also include a mixer 356a (e.g., a downconverter). The mixer 356a may be coupled to the output of the first 1Rx low noise amplifier (LNA) 348a, the output of the second 1Rx low noise amplifier (LNA) 348b, the output of the third 1Rx low noise amplifier (LNA) 348c and the output of the fourth 1Rx low noise amplifier (LNA) 348d.

The first receiver (1Rx) 340 may include a phase locked loop (PLL) 362a, a 1Rx voltage controlled oscillator (VCO) 360 and a Div stage 358a that are used to generate the downconverting frequency for the mixer 356a. The output of the mixer 356a may be coupled to a 1Rx baseband filter (BBF) 364a. The 1Rx baseband filter (BBF) 364a may then output the 1Rx inphase/quadrature (I/Q) signal 312. The transceiver chip 310 may include a switch 366 that allows the downconverting frequency generated by the 1Rx voltage controlled oscillator (VCO) 360 to be used by a mixer 356b in the second receiver (2Rx) 342, a mixer 356c in the third receiver (3Rx) 344 and/or a mixer 356d in the fourth receiver (4Rx) 346.

The second antenna 308 may be coupled to the second low-pass high-pass diplexer 326b. The second low-pass high-pass diplexer 326b may be coupled to the second switch 328b. The second switch 328b may have two inputs (the signal that includes the bundled low band frequencies and the signal that includes the bundled high band frequencies) and multiple outputs. In one configuration, the second switch 328b may have six possible outputs to four surface acoustic wave (SAW) filters 334a-d (representing the six possible configurations of surface acoustic wave (SAW) filter 334a-d pairs). The four surface acoustic wave (SAW) filters 334a-d may include a first surface acoustic wave (SAW) filter 334a, a second surface acoustic wave (SAW) filter 334b, a third surface acoustic wave (SAW) filter 334c and a fourth surface acoustic wave (SAW) filter 334d.

The second receiver (2Rx) 342 may include a first 2Rx low noise amplifier (LNA) 350*a* coupled to the first surface acoustic wave (SAW) filter 334*a*, a second 2Rx low noise amplifier (LNA) 350*b* coupled to the second surface acoustic wave (SAW) filter 334*b*, a third 2Rx low noise amplifier (LNA) 350*c* coupled to the third surface acoustic wave (SAW) filter 334*c* and a fourth 2Rx low noise amplifier (LNA) 350*d* coupled to the fourth surface acoustic wave (SAW) filter 334*d*.

The second receiver (2Rx) 342 may include a mixer 356*b* coupled to the output of the first 2Rx low noise amplifier (LNA) 350*a*, the output of the second 2Rx low noise amplifier (LNA) 350*b*, the output of the third 2Rx low noise amplifier (LNA) 350*c* and the output of the fourth 2Rx low noise amplifier (LNA) 350*d*. The second receiver (2Rx) 342 may also include a phase locked loop (PLL) 362*b*, a 2Rx voltage controlled oscillator (VCO) 361 and a Div stage 358*b* that are used to generate a downconverting frequency for the mixer 356*b*. In one configuration, the switch 366 on the transceiver chip 310 may be set so that the Div stage 358*b* receives the downconverting frequency generated by the 1Rx voltage controlled oscillator (VCO) 360 from the first receiver (1Rx) 340. The output of the mixer 356*b* may be coupled to a 2Rx baseband filter (BBF) 364*b*. The 2Rx baseband filter (BBF) 364*b* may then output the 2Rx inphase/quadrature (I/Q) signal 314.

The switch 366 allows the downconverting frequency generated by the 2Rx voltage controlled oscillator (VCO) 361 to be used by a mixer 356*c* in the third receiver (3Rx) 344 and a mixer 356*d* in the fourth receiver (4Rx) 346. The 2Rx voltage controlled oscillator (VCO) 361 may be used for the third receiver (3Rx) 344 and/or fourth receiver (4Rx) 346 in non-carrier aggregation, non-simultaneous hybrid dual receiver (SHDR) mode. Otherwise, the 2Rx voltage controlled oscillator (VCO) 361 may be idle.

When used in non-carrier aggregation, non-simultaneous hybrid dual receiver (SHDR) mode, the 2Rx voltage controlled oscillator (VCO) 361 may be tuned to a secondary frequency to drive secondary diversity. For example, the secondary frequency may be a Personal Digital Cellular (PDC) band around 1.5 gigahertz (GHz) used for global positioning system (GPS). Thus, in this example, the 2Rx voltage controlled oscillator (VCO) 361 may be tuned to around 1.5 GHz and may be used to drive the fourth receiver (4Rx) 346. As a result, the fourth receiver (4Rx) 346 may be reused to support the Personal Digital Cellular (PDC) band. The 4Rx inphase/quadrature (I/Q) signal 318 and the 5Rx inphase/quadrature (I/Q) signal 319 may then be combined for secondary diversity. In other words, the fourth receiver (4Rx) 346 inphase/quadrature (I/Q) signal 318 may be added to the fifth receiver (5Rx) 347 inphase/quadrature (I/Q) signal 319 to increase and/or expand the multiple-input and multiple-output (MIMO) capabilities of the third band 276.

In another example, the secondary frequency may be an unlicensed band around 2.4 gigahertz (GHz) used for Wi-Fi and/or Bluetooth. Thus, in this example, the 2Rx voltage controlled oscillator (VCO) 361 may be tuned to around 2.4 GHz and may be used to drive the fourth receiver (4Rx) 346. As a result, the fourth receiver (4Rx) 346 may be reused to support Wi-Fi and/or Bluetooth around 2.4 GHz. In some configurations, the 4Rx inphase/quadrature (I/Q) signal 318 and the 5Rx inphase/quadrature (I/Q) signal 319 may then be combined for secondary diversity, such as both employing Wi-Fi diversity. The 4Rx inphase/quadrature (I/Q) signal 318 and the 5Rx inphase/quadrature (I/Q) signal 319 may each employ a separate non-cellular signal, such as the 4Rx inphase/quadrature (I/Q) signal 318 corresponding to Wi-Fi while the 5Rx inphase/quadrature (I/Q) signal 319 corresponding to Bluetooth.

The third receiver (3Rx) 344 may include a first 3Rx low noise amplifier (LNA) 352*a*, a second 3Rx low noise amplifier (LNA) 352*b*, a third 3Rx low noise amplifier (LNA) 352*c* and a fourth 3Rx low noise amplifier (LNA) 352*d*. The inputs to the first 3Rx low noise amplifier (LNA) 352*a*, the second 3Rx low noise amplifier (LNA) 352*b*, the third 3Rx low noise amplifier (LNA) 352*c* and the fourth 3Rx low noise amplifier (LNA) 352*d* may be disabled.

The third receiver (3Rx) 344 may include a mixer 356*c* coupled to the outputs of the first 3Rx low noise amplifier (LNA) 352*a*, the second 3Rx low noise amplifier (LNA) 352*b*, the third 3Rx low noise amplifier (LNA) 352*c* and the fourth 3Rx low noise amplifier (LNA) 352*d*. The third receiver (3Rx) 344 may also include a Div stage 358*c* coupled to the mixer 356*c*. The Div stage 358*c* may be coupled to the switch 366 on the transceiver chip 310. In one configuration, the switch 366 may be set so that the Div stage 358*c* may receive the downconverting frequency generated by the 1Rx voltage controlled oscillator (VCO) 360 from the first receiver (1Rx) 340. In another configuration, the switch 366 may be set so that the Div stage 358*c* receives the downconverting frequency generated by the 2Rx voltage controlled oscillator (VCO) 361. In some configurations, such as in non-carrier aggregation mode and/or non-simultaneous hybrid dual receiver (SHDR) mode, the third receiver (3Rx) 344 may remain idle and unused or reused for secondary diversity. The output of the mixer 356*c* may be coupled to a 3Rx baseband filter (BBF) 364*c*. The 3Rx baseband filter (BBF) 364*c* may then output the 3Rx inphase/quadrature (I/Q) signal 316.

The fourth receiver (4Rx) 346 may include a first 4Rx low noise amplifier (LNA) 354*a*, a second 4Rx low noise amplifier (LNA) 354*b*, a third 4Rx low noise amplifier (LNA) 354*c* and a fourth 4Rx low noise amplifier (LNA) 354*d*. The inputs to the first 4Rx low noise amplifier (LNA) 354*a*, the second 4Rx low noise amplifier (LNA) 354*b*, the third 4Rx low noise amplifier (LNA) 354*c* and the fourth 4Rx low noise amplifier (LNA) 354*d* may be disabled. In some configurations, one or more of the 4Rx low noise amplifier (LNAs) 354 may receive input from a fifth surface acoustic wave (SAW) filter 334*e* coupled to the third antenna 307. For example, the third antenna 307 may provide a signal to the third 4Rx low noise amplifier (LNA) 354*c* via the fifth surface acoustic wave (SAW) filter 334*e*.

The fourth receiver (4Rx) 346 may include a mixer 356*d* coupled to the outputs of the first 4Rx low noise amplifier (LNA) 354*a*, the second 4Rx low noise amplifier (LNA) 354*b*, the third 4Rx low noise amplifier (LNA) 354*c* and the fourth 4Rx low noise amplifier (LNA) 354*d*. The fourth receiver (4Rx) 346 may also include a Div stage 358*d* coupled to the mixer 356*d*. The Div stage 358*d* may be coupled to the switch 366 on the transceiver chip 310. In one configuration, the switch 366 may be set so that the Div stage 358*d* may receive the downconverting frequency generated by the 1Rx voltage controlled oscillator (VCO) 360 from the first receiver (1Rx) 340. In another configuration, such as in non-carrier aggregation mode and/or non-simultaneous hybrid dual receiver (SHDR) mode, the fourth receiver (4Rx) 346 may remain idle and unused. The output of the mixer 356*d* may be coupled to a 4Rx baseband filter (BBF) 364*d*. The 4Rx baseband filter (BBF) 364*d* may then output the 4Rx inphase/quadrature (I/Q) signal 318.

In one configuration, the switch 366 may be set so that the Div stage 358*d* of the fourth receiver (4Rx) 346 receives the downconverting frequency generated by the 2Rx voltage controlled oscillator (VCO) 361 from the second receiver (2Rx) 342. For example, the 2Rx voltage controlled oscillator (VCO) 361 from the second receiver (2Rx) 342 may be tuned to the secondary frequency to drive secondary diversity for the fourth receiver (4Rx) 346.

The fourth antenna 309 may be coupled to a sixth surface acoustic wave (SAW) filter 334f. The sixth surface acoustic wave (SAW) filter 334f may be coupled to the fifth receiver (5Rx) 347. The fifth receiver (5Rx) 347 may include a first 5Rx low noise amplifier (LNA) 355a.

The fifth receiver (5Rx) 344 may also include a mixer 356e (e.g., a downconverter). The mixer 356e may be coupled to the output of the first 5Rx low noise amplifier (LNA) 355a.

The fifth receiver (5Rx) 347 may include a phase locked loop (PLL) 362c, a 5Rx voltage controlled oscillator (VCO) 363 and a Div stage 358e that are used to generate the downconverting frequency for the mixer 356e. The output of the mixer 356e may be coupled to a 5Rx baseband filter (BBF) 364e. The 5Rx baseband filter (BBF) 364e may then output the 5Rx inphase/quadrature (I/Q) signal 319. The 5Rx inphase/quadrature (I/Q) signal 319 may be a secondary signal such as a global navigation satellite system (GNSS), a global positioning system (GPS) or a Wi-Fi signal.

Figure 4:
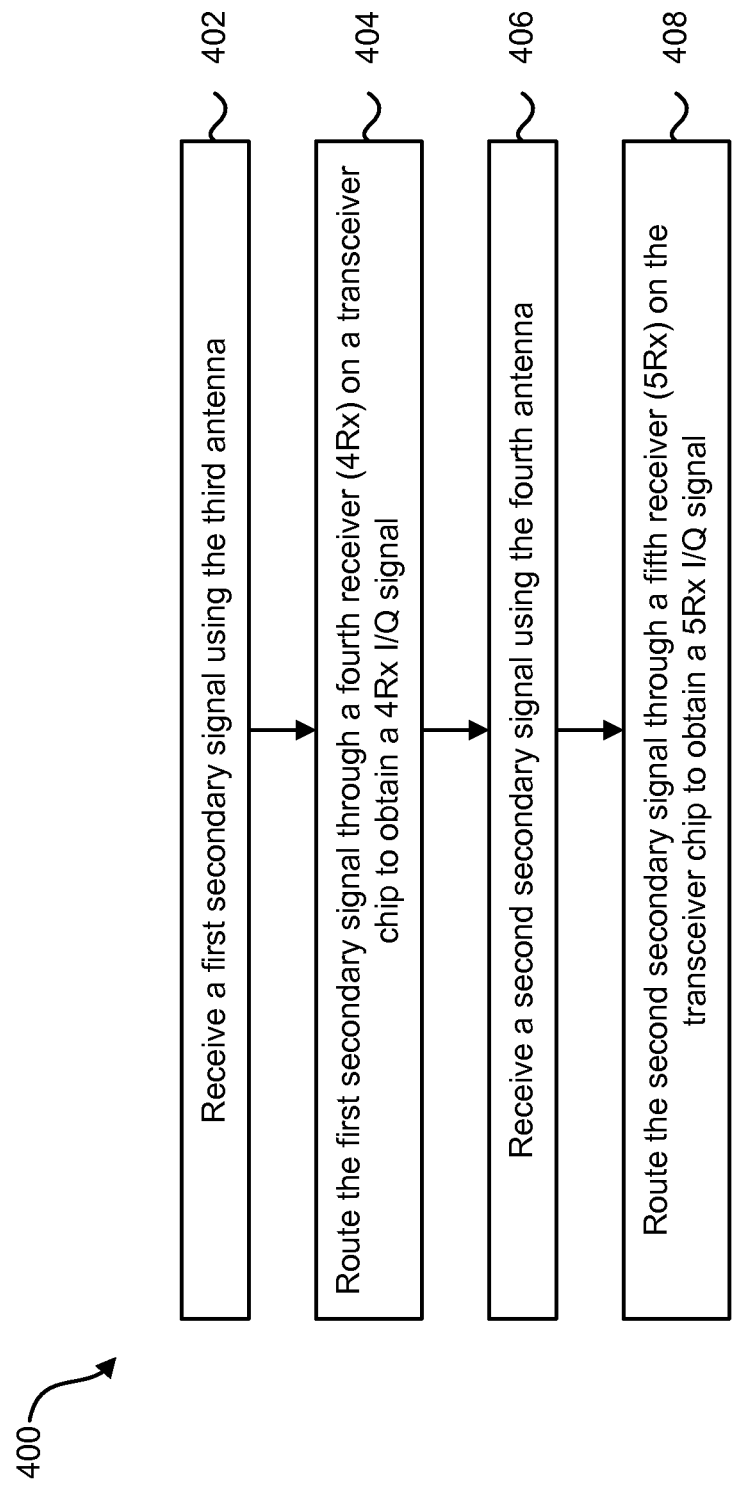
FIG. 4 is a flow diagram of a method for receiving signals using a single-chip carrier aggregation receiver architecture.

FIG. 4 is a flow diagram of a method 400 for receiving signals using a single-chip carrier aggregation receiver architecture 125. The method 400 may be performed by a wireless communication device 104. The wireless communication device 104 may receive 402 a first secondary signal using the third antenna 107. The wireless communication device 104 may route 404 the first secondary signal through a fourth receiver (4Rx) 146 on a transceiver chip 110 to obtain a 4Rx inphase/quadrature (I/Q) signal 118.

The wireless communication device 104 may also receive 406 a second secondary signal using the fourth antenna 109. The wireless communication device 104 may route 408 the second secondary signal through a fifth receiver (5Rx) 147 on the transceiver chip 110 to obtain a 5Rx inphase/quadrature (I/Q) signal 119. The first secondary signal and the second secondary signal may be from the same band (e.g., the third band 276). For instance, the third band 276 may be a global navigation satellite system (GNSS) band, a global positioning system (GPS) band, a Wi-Fi band or some other type of band.

Figure 5:
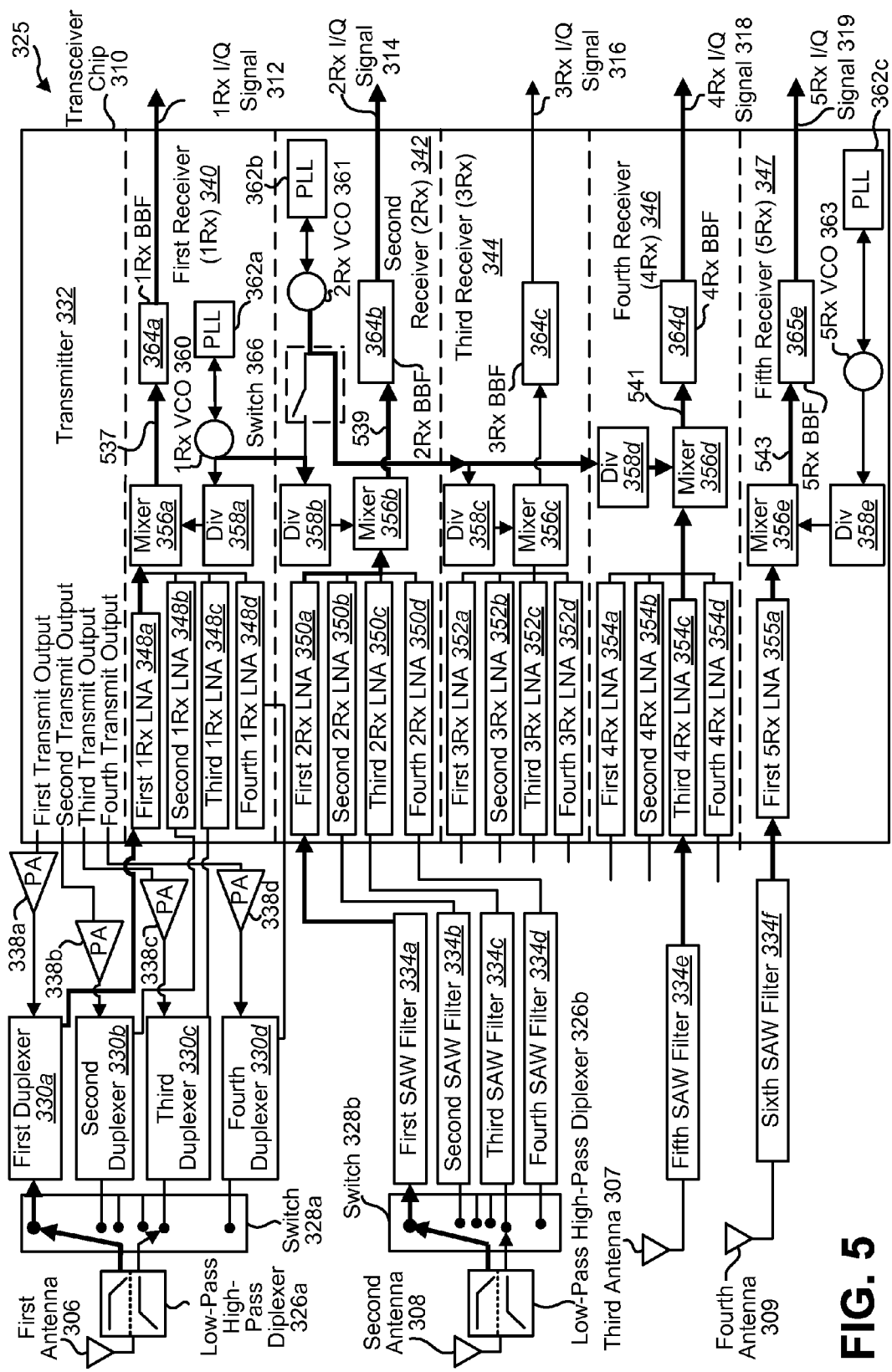
FIG. 5 is a block diagram illustrating a single-chip carrier aggregation receiver architecture operating in diversity mode.

FIG. 5 is a block diagram illustrating a single-chip carrier aggregation receiver architecture 325 operating in diversity mode. The single-chip carrier aggregation receiver architecture 325 of FIG. 5 may be the single-chip carrier aggregation receiver architecture 325 of FIG. 3.

A routing 537 from the first antenna 306 through the first receiver (1Rx) 340 to obtain the 1Rx inphase/quadrature (I/Q) signal 314 is shown. The routing 537 may pass through the first 1Rx low noise amplifier (LNA) 348a. The 1Rx inphase/quadrature (I/Q) signal 314 may include a first carrier 274a and a second carrier 274b from a first band 270 for this configuration. The routing 537 may pass through the mixer 356b. The mixer 356b may receive input from the Div stage 358b. The switch 366 on the transceiver chip 310 may be set so that the Div stage 358b receives the downconverting frequency generated by the 1Rx voltage controlled oscillator (VCO) 360 from the first receiver (1Rx) 340. In this manner, the 2Rx voltage controlled oscillator (VCO) 361 from the second receiver (2Rx) 342 may be used with the third receiver (3Rx) 344 and/or the fourth receiver (4Rx) 346.

A routing 539 from the second antenna 308 through the second receiver (2Rx) 342 to obtain the 2Rx inphase/quadrature (I/Q) signal 316 is also shown. The routing 539 may pass through the first 2Rx low noise amplifier (LNA) 350a. The 2Rx inphase/quadrature (I/Q) signal 314 may include a first carrier 274a and a second carrier 274b from the first band 270 for this configuration.

Is some configurations, such as when a simultaneous hybrid dual receiver (SHDR) receiver path is not employed by the transceiver chip 310, the third receiver (3Rx) 344 and/or the fourth receiver (4Rx) 346 may be reused for secondary diversity. For example, the fourth receiver (4Rx) 346 may be a carrier aggregation receiver. When not used for carrier aggregation, the fourth receiver (4Rx) 346 may be reused for secondary diversity.

A routing 541 from the third antenna 307 through the fourth receiver (4Rx) 346 to obtain the 4Rx inphase/quadrature (I/Q) signal 318 is also shown. The routing 541 may be referred to as a first secondary routing. For example, the first secondary routing may correspond to a non-cellular signal such as a global positioning system (GPS) or Wi-Fi signal. The routing 541 may pass through the third 4Rx low noise amplifier (LNA) 354c. In some configurations, an additional transconductance stage (Gm) may be added to the fourth receiver (4Rx) 346 path to support secondary diversity and to avoid additional switches.

The routing 541 may pass through the mixer 356d. The mixer 356d may receive input from the Div stage 358d. The switch 366 on the transceiver chip 310 may be set so that the Div stage 358d receives the downconverting frequency generated by the 2Rx voltage controlled oscillator (VCO) 361 from the second receiver (2Rx) 342. In other words, the 2Rx voltage controlled oscillator (VCO) 361 from the second receiver (2Rx) 342 is be used to drive the Div stage 358d and mixer 356d of the fourth receiver (4Rx) 346 rather than being used the drive the Div stage 358b and mixer 356b of the second receiver (2Rx) 342. The output of the mixer 356d may pass through the 4Rx baseband filter (BBF) 364d to form a 4Rx inphase/quadrature (I/Q) signal 318. The 4Rx inphase/quadrature (I/Q) signal 318 may include a secondary signal 278 from the third band 276.

A routing 543 from the fourth antenna 309 through the fifth receiver (5Rx) 347 to obtain the 5Rx inphase/quadrature (I/Q) signal 319 is also shown. The routing 543 may be referred to as a second secondary routing. For example, the second secondary routing may correspond to a non-cellular signal such as a global positioning system (GPS) or Wi-Fi signal. The second secondary routing may correspond to the same non-cellular (i.e. secondary) technology as the first secondary routing. For example, both the first secondary routing and the second secondary routing may correspond to a global positioning system (GPS) signal. In another example, the first secondary routing may correspond to a global positioning system (GPS) signal while the second secondary routing may correspond to a Wi-Fi signal. In this manner, the single-chip carrier aggregation receiver architecture 125 may be used to employ one or more secondary signals 278 when carrier aggregation mode is idle. In addition, when multiple receivers on the transceiver chip 310 are processing the secondary signal 278, secondary diversity may be achieved.

The routing 543 may pass through the sixth surface acoustic wave (SAW) filter 334f and the first 5Rx low noise amplifier (LNA) 355a. The 5Rx inphase/quadrature (I/Q) signal 319 may include secondary signal 278 from the third band 276.

In some configurations, the routing 541 through the fourth receiver (4Rx) 346 may be driven by the 2Rx voltage controlled oscillator (VCO) 361 from the second receiver (2Rx) 342 and the routing 543 through the fifth receiver (5Rx) 347 may be driven by the 5Rx voltage controlled oscillator (VCO) 363 from the fifth receiver (5Rx) 347. Both the 2Rx voltage controlled oscillator (VCO) 361 and the 5Rx voltage controlled oscillator (VCO) 363 may be tuned to the secondary frequency. In some instances, when the 2Rx voltage controlled oscillator (VCO) 361 and the 5Rx voltage controlled oscillator (VCO) 363 are tuned to the same frequency, they may interfere with each other. For example, the voltage controlled oscillators (VCOs) may pull each other away from the desired frequency.

When running in secondary diversity mode, carrier aggregation receivers 3Rx 344 and/or 4Rx 346 may not be able to be used for secondary diversity. Likewise, when the transceiver chip 210 is running in secondary diversity mode, the transceiver chip 210 may not be able to concurrently run in simultaneous hybrid dual receiver (SHDR). In other words, in some configurations, operating in secondary diversity mode may be mutually exclusive from operating in simultaneous hybrid dual receiver (SHDR) mode and/or carrier aggregation mode.

Figure 6:
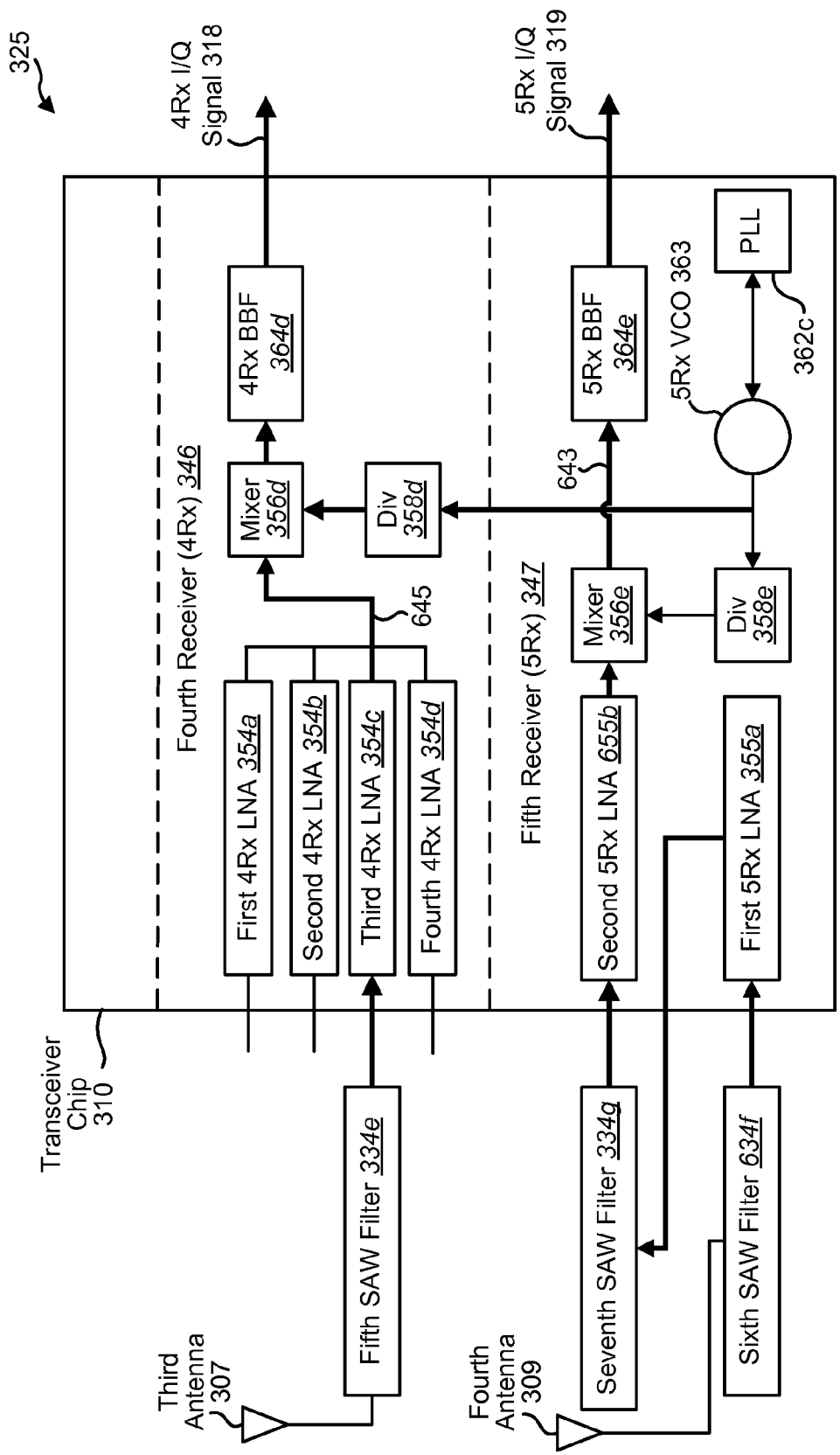
FIG. 6 is a block diagram illustrating a single-chip carrier aggregation receiver architecture that reuses a carrier aggregation receiver to achieve secondary diversity.

FIG. 6 is a block diagram illustrating a single-chip carrier aggregation receiver architecture 325 that reuses a carrier aggregation receiver to achieve secondary diversity. The single-chip carrier aggregation receiver architecture 325 of FIG. 6 may be the single-chip carrier aggregation receiver architecture 325 of FIG. 3. For simplicity, FIG. 6 only illustrates the third antenna 307, fourth antenna 309, fourth receiver (4Rx) 346 and fifth receiver (5Rx) 347 of the transceiver chip 310. However, it should be appreciated that the transceiver chip 310 of FIG. 6 may include some or all of the other components shown and described in connection with the transceiver chip 310 of FIG. 3.

In some configurations, when not in carrier aggregation mode, the fourth receiver (4Rx) 346 may be idle. In other words, the fourth receiver (4Rx) 346 is not being used for carrier aggregation. Similarly, the fourth receiver (4Rx) 346 may be idle when the transceiver chip 310 is not in simultaneous hybrid dual receiver (SHDR) mode. In these instances, the fourth receiver (4Rx) 346 may be reused for secondary diversity. In this manner, the fourth receiver (4Rx) 346 may share the frontend, mixer 356d, divider 358d and the 4Rx baseband filter (BBF) 364d from the carrier aggregation path to achieve secondary diversity.

The third antenna 307 and the fourth antenna 309 may receive a secondary signal 278. For example, the signal may be a global navigation satellite system (GNSS), global positioning system (GPS), Wi-Fi or Bluetooth signal. For instance, the secondary signal 278 may be a global positioning system (GPS) signal received on a Personal Digital Cellular (PDC) band. In another instance, the secondary signal 278 may be a Wi-Fi or a Bluetooth signal received on a 2.4 gigahertz (GHz) band.

A routing 645 from the third antenna 307 through the fourth receiver (4Rx) 346 to obtain the 4Rx inphase/quadrature (I/Q) signal 318 is shown. The routing 645 may be referred to as a first secondary routing. The routing 645 may pass through the fifth surface acoustic wave (SAW) filter 334e and the third 4Rx low noise amplifier (LNA) 354c. The routing 645 may pass through the mixer 356d. The mixer 356d may receive input from the Div stage 358d. The Div stage 358d may receive a downconverting frequency generated by the 5Rx voltage controlled oscillator (VCO) 363 of the fifth receiver (5Rx) 347. The routing 645 may pass through the 4Rx baseband filter (BBF) 364d to form a 4Rx inphase/quadrature (I/Q) signal 318. The 4Rx inphase/quadrature (I/Q) signal 318 may include a secondary signal 278 from the third band 276.

A routing 643 from the fourth antenna 309 through the fifth receiver (5Rx) 347 to obtain the 5Rx inphase/quadrature (I/Q) signal 319 is also shown. The 5Rx inphase/quadrature (I/Q) signal 319 may include a secondary signal 278 from the third band 276.

The routing 643 may be referred to as a second secondary routing. The routing 643 may pass through the sixth surface acoustic wave (SAW) filter 334f and the first 5Rx low noise amplifier (LNA) 355a. In some embodiments, as shown in FIG. 6, the routing 643 may pass through a seventh surface acoustic wave (SAW) filter 634g and a second 5Rx low noise amplifier (LNA) 655b. The seventh surface acoustic wave (SAW) filter 634g and the second 5Rx low noise amplifier (LNA) 655b may provide additional signal filtering that may result in a higher signal performance.

Both the fourth receiver (4Rx) 346 and the fifth receiver (5Rx) 347 may be driven by the same synthesizer (e.g., the 5Rx voltage controlled oscillator (VCO) 363 and the phase lock loop (PLL) 362c from the fifth receiver (5Rx) 347). In this manner, multiple synthesizers are not competing and pulling against each other causing the frequency to stray or other errors.

Figure 7:
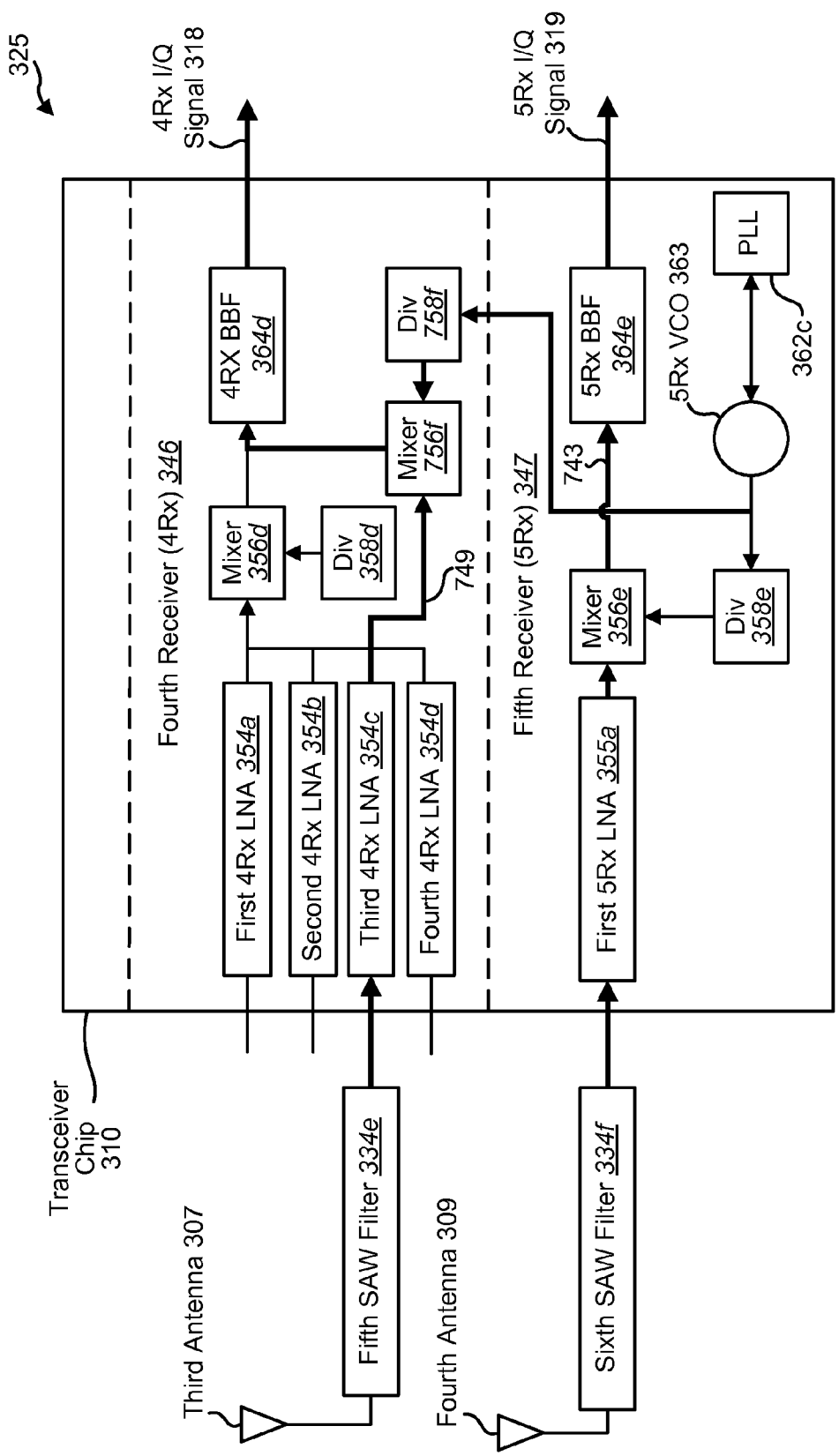
FIG. 7 is a block diagram illustrating a single-chip carrier aggregation receiver architecture that reuses a receiver front end and a baseband filter (BBF) of a carrier aggregation receiver to achieve secondary diversity.

FIG. 7 is a block diagram illustrating a single-chip carrier aggregation receiver architecture 325 that reuses a receiver front end and a baseband filter (BBF) of a carrier aggregation receiver to achieve secondary diversity. The single-chip carrier aggregation receiver architecture 325 of FIG. 7 may be the single-chip carrier aggregation receiver architecture 325 of FIG. 3. For simplicity, FIG. 7 only illustrates the third antenna 307, fourth antenna 309, fourth receiver (4Rx) 346 and fifth receiver (5Rx) 347 of the transceiver chip 310. However, it should be appreciated that the transceiver chip 310 of FIG. 7 may include some or all of the other components shown and described in connection with the transceiver chip 310 of FIG. 3.

The third antenna 307 and the fourth antenna 309 may receive a secondary signal 278. For example, the signal may be a global navigation satellite system (GNSS), global positioning system (GPS) or Wi-Fi signal. In some configurations, the fourth receiver (4Rx) 346 may share the low noise amplifier (LNA) 354 and the 4Rx baseband filter (BBF) 364d from the carrier aggregation path to achieve secondary diversity.

The fourth receiver (4Rx) 346 of FIG. 7 may include a mixer 756f and a Div stage 758f that were not included in the fourth receiver (4Rx) 346 of FIG. 3.

A routing 749 from the third antenna 307 through the fourth receiver (4Rx) 346 to obtain the 4Rx inphase/quadrature (I/Q) signal 318 is shown. The routing 749 may be referred to as a first secondary routing. The routing 749 may pass through the fifth surface acoustic wave (SAW) filter 334e and the third 4Rx low noise amplifier (LNA) 354c. The routing 749 may pass through the mixer 756f. The mixer 756f may receive input from the Div stage 758f. The mixer 756f (e.g., downconverter) and the Div stage 758f may be separate from the mixer 356d and the Div stage 358d used for carrier aggregation in the fourth receiver (4Rx) 346. In this manner, power consumption may be reduced by reducing the power necessary to drive the mixer 756f.

The Div stage 758f may receive a downconverting frequency generated by the 5Rx voltage controlled oscillator (VCO) 363 of the fifth receiver (5Rx) 347. The routing 749 may pass through the 4Rx baseband filter (BBF) 364d to form a 4Rx inphase/quadrature (I/Q) signal 318. The 4Rx inphase/quadrature (I/Q) signal 318 may include a secondary signal 278 from the third band 276.

A routing 743 from the fourth antenna 309 through the fifth receiver (5Rx) 347 to obtain the 5Rx inphase/quadrature (I/Q)

signal 319 is also shown. The 5Rx inphase/quadrature (I/Q) signal 319 may include a secondary signal 278 from the third band 276.

The routing 743 may be referred to as a second secondary routing. The routing 743 may pass through the sixth surface acoustic wave (SAW) filter 334f and the first 5Rx low noise amplifier (LNA) 355a.

Figure 8:
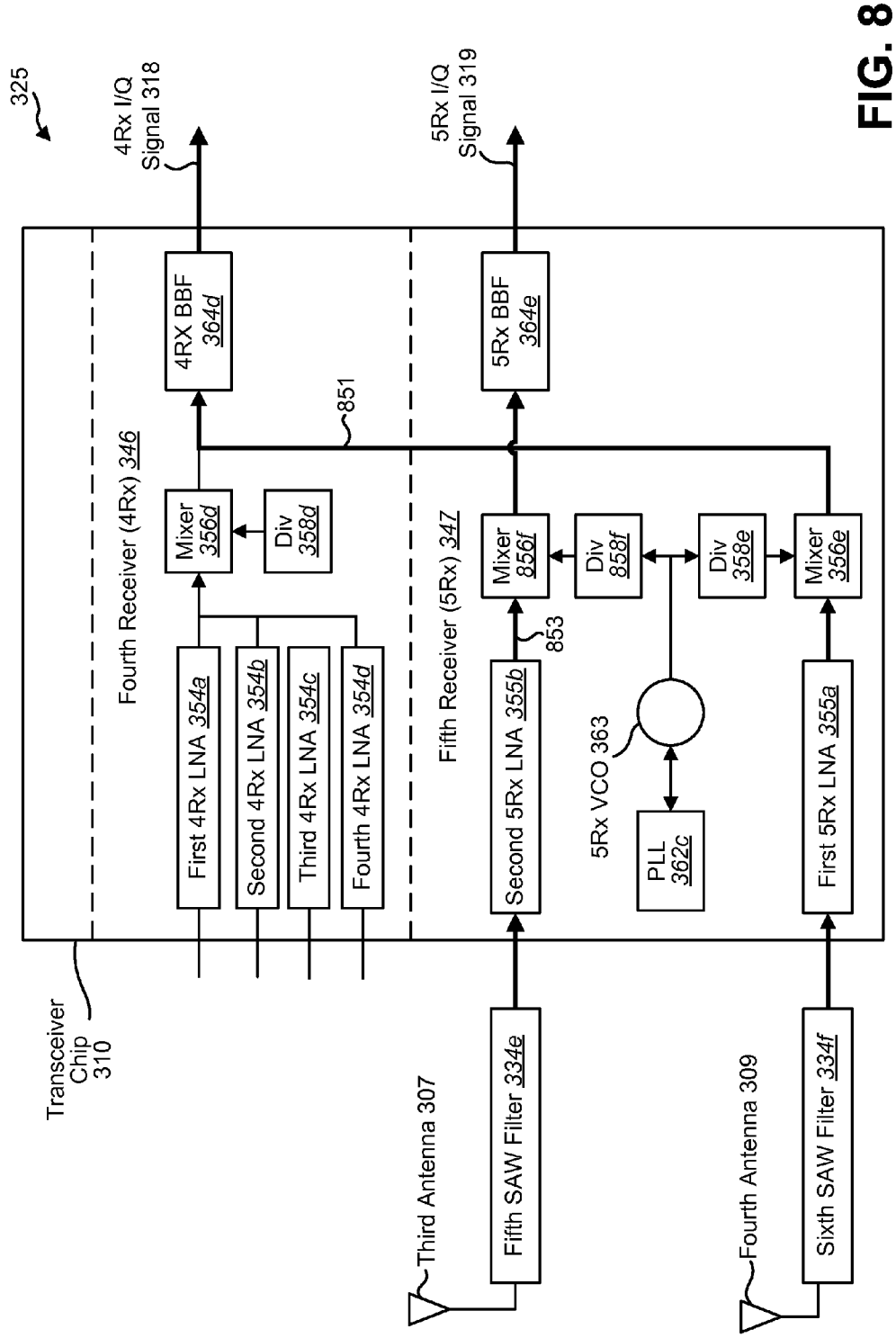
FIG. 8 is a block diagram illustrating a single-chip carrier aggregation receiver architecture that reuses a baseband filter (BBF) of a carrier aggregation receiver to achieve secondary diversity.

FIG. 8 is another block diagram illustrating a single-chip carrier aggregation receiver architecture 325 that reuses a baseband filter (BBF) of a carrier aggregation receiver to achieve secondary diversity. As with FIG. 6 and FIG. 7, FIG. 8 illustrates only the third antenna 307, fourth antenna 309, fourth receiver (4Rx) 346 and fifth receiver (5Rx) 347 of the transceiver chip 310. However, it should be appreciated that the transceiver chip 310 of FIG. 8 may include some or all of the other components shown and described in connection with the transceiver chip 310 of FIG. 3.

The third antenna 307 and the fourth antenna 309 may receive a secondary signal 278. For example, the secondary signal 278 may be a global navigation satellite system (GNSS), global positioning system (GPS) or Wi-Fi signal. In one configuration, the secondary signal 278 may be a global positioning system (GPS) signal received on a Personal Digital Cellular (PDC) band.

A routing 853 from the third antenna 307 through the fifth receiver (5Rx) 346 to obtain the 5Rx inphase/quadrature (I/Q) signal 319 is shown. The routing 853 may be referred to as a first secondary routing. The routing 853 may pass through the fifth surface acoustic wave (SAW) filter 334e and the first 5Rx low noise amplifier (LNA) 355a. The routing 853 may pass through the mixer 856f. The mixer 856f may receive input from the Div stage 858f. The mixer 856f (e.g., downconverter) and the Div stage 858f may be separate from the mixer 356e and the Div stage 358e used in the fifth receiver (5Rx) 347.

The Div stage 858f may receive a downconverting frequency generated by the 5Rx voltage controlled oscillator (VCO) 363 from the fifth receiver (5Rx) 347. The routing 853 may also pass through the 5Rx baseband filter (BBF) 364e to form a 5Rx inphase/quadrature (I/Q) signal 319. The 5Rx inphase/quadrature (I/Q) signal 319 may include a secondary signal 278 from the third band 276. In this manner, the fourth receiver (4Rx) 346 may share the 4Rx baseband filter (BBF) 364d from the carrier aggregation path to achieve secondary diversity.

A routing 851 from the fourth antenna 309 through the fifth receiver (5Rx) 347 to obtain the 4Rx inphase/quadrature (I/Q) signal 318 is also shown. The routing 851 may be referred to as a second secondary routing. The routing 851 may pass through the sixth surface acoustic wave (SAW) filter 334f and the first 5Rx low noise amplifier (LNA) 355a. The routing 851 may then pass through the 4Rx baseband filter (BBF) 364d to form a 4Rx inphase/quadrature (I/Q) signal 318. In this manner, the 4Rx baseband filter (BBF) 364d of the fourth receiver (4Rx) 346 is reused for secondary diversity. The 4Rx inphase/quadrature (I/Q) signal 318 may include a secondary signal 278 from the third band 276.

Figure 9:
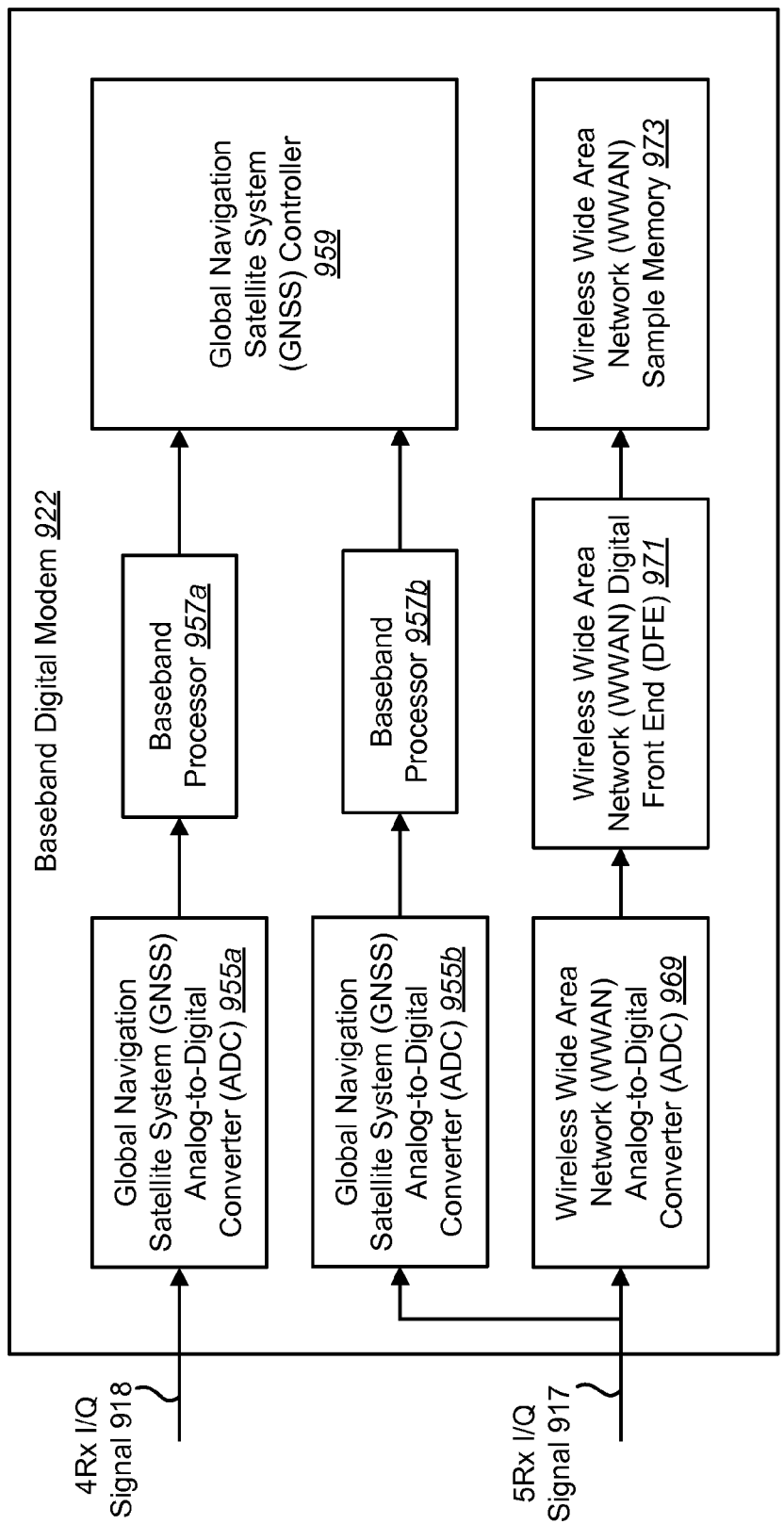
FIG. 9 is a block diagram illustrating one configuration of a baseband digital modem used for secondary (e.g., global navigation satellite system (GNSS)) diversity.

FIG. 9 is a block diagram illustrating one configuration of a baseband digital modem 922 used for secondary (e.g., global navigation satellite system (GNSS)) diversity. The baseband digital modem 922 may be part of the transceiver chip 310 or a separate component from the transceiver chip 310. The baseband digital modem 922 may be one configurations of the baseband digital modem described in connection with the baseband digital modem 122 of FIG. 1.

The baseband digital modem 922 may include a first global navigation satellite system (GNSS) analog-to-digital converter (ADC) 955a, a first baseband processor 957a, a global navigation satellite system (GNSS) controller 959, a second global navigation satellite system (GNSS) analog-to-digital converter (ADC) 955b, a second baseband processor 957b, a wireless wide area network (WWAN) analog-to-digital converter (ADC) 969, a wireless wide area network (WWAN) digital front end (DFE) 971 and a wireless wide area network (WWAN) sample memory 973. The baseband digital modem 922 may receive a 4Rx inphase/quadrature (I/Q) signal 918 and a 5Rx inphase/quadrature (I/Q) signal 919. The global navigation satellite system (GNSS) controller 959 may employ multiple digital signals to obtain a more accurate determination of the wireless communication device 104.

The first global navigation satellite system (GNSS) analog-to-digital converter (ADC) 955a may receive the 4Rx I/Q signal 918. The first global navigation satellite system (GNSS) analog-to-digital converter (ADC) 955a may convert the 4Rx inphase/quadrature (I/Q) signal 918 from an analog signal to a digital signal. The digital signal may pass through the first baseband processor 957a and into the global navigation satellite system (GNSS) controller 959. A global navigation satellite system (GNSS) may include global positioning systems (GPS), satellite based augmentation systems (SBAS) and/or ground based augmentation systems (GBAS). The global navigation satellite system (GNSS) controller 959 may determine the location of the wireless communication device 104 based on the digital signal.

The 5Rx inphase/quadrature (I/Q) signal 919 may be passed through the second global navigation satellite system (GNSS) analog-to-digital converter (ADC) 955b to obtain a digital signal. The digital signal may be passed through the second baseband processor 957b before being input into the global navigation satellite system (GNSS) controller 959. By obtaining multiple secondary signals (e.g., global positioning system (GPS) signals), the global navigation satellite system (GNSS) controller 959 may have improved accuracy.

The 5Rx inphase/quadrature (I/Q) signal 919 may also be provided to the wireless wide area network (WWAN) analog-to-digital converter (ADC) 969. The output of the wireless wide area network (WWAN) analog-to-digital converter (ADC) 969 may be passed through the wireless wide area network (WWAN) digital front end (DFE) 971 and stored in the wireless wide area network (WWAN) sample memory 973. The second global navigation satellite system (GNSS) analog-to-digital converter (ADC) 955b and the wireless wide area network (WWAN) analog-to-digital converter (ADC) 969 may share pins for the 5Rx inphase/quadrature (I/Q) signal 919.

In some configurations, the second global navigation satellite system (GNSS) analog-to-digital converter (ADC) 955b may be added to a known baseband digital modem configurations. In this configuration, the second baseband processor 957b may already exist on the baseband digital modem 922 and may be reused to process the digital output from the second global navigation satellite system (GNSS) analog-to-digital converter (ADC) 955b. Adding the second global navigation satellite system (GNSS) analog-to-digital converter (ADC) 955b may require a minor increase (e.g., 28 nanometers (nm)) in die size on the baseband digital modem 922 and the second global navigation satellite system (GNSS) analog-to-digital converter (ADC) 955b may be limited to non-terrestrial signals. However, power consumption may be reduced in obtaining secondary diversity using the baseband digital modem 922 as compared to known approaches for obtaining secondary diversity.

Figure 10:
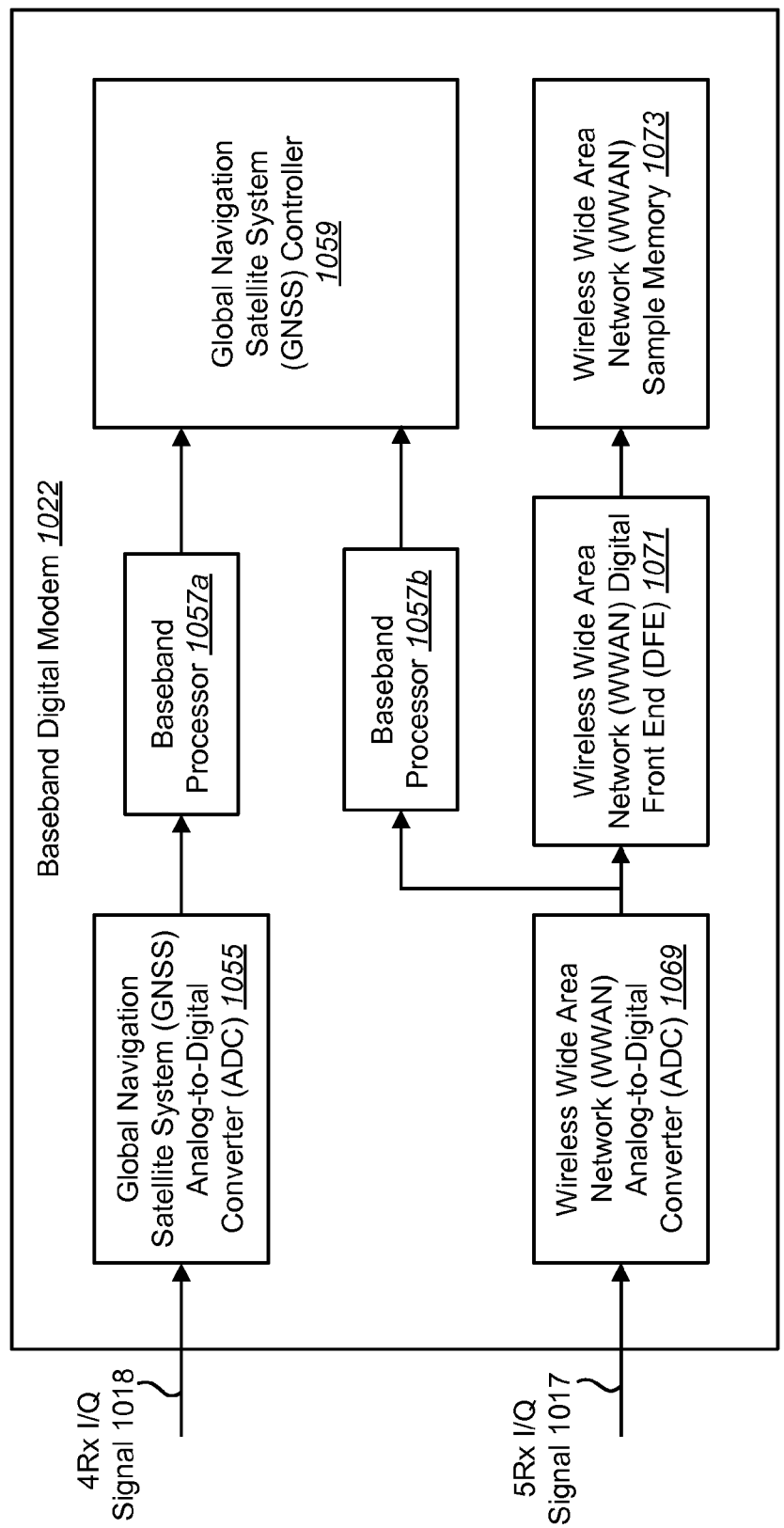
FIG. 10 is a block diagram illustrating another configuration of a baseband digital modem used for secondary (e.g., global navigation satellite system (GNSS)) diversity.

FIG. 10 is a block diagram illustrating another configuration of a baseband digital modem 1022 used for secondary (e.g., global navigation satellite system (GNSS)) diversity.

The baseband digital modem 1022 may be one configurations of the baseband digital modem 112 described in connection with FIG. 1. The baseband digital modem 1022 may include a global navigation satellite system (GNSS) analog-to-digital converter (ADC) 1055, a first baseband processor 1057a, a global navigation satellite system (GNSS) controller 1059, a second baseband processor 1057b, a wireless wide area network (WWAN) analog-to-digital converter (ADC) 1069, a wireless wide area network (WWAN) digital front end (DFE) 1071 and a wireless wide area network (WWAN) sample memory 1073. The baseband digital modem 1022 may receive the 4Rx inphase/quadrature (I/Q) signal 1018 and the 5Rx inphase/quadrature (I/Q) signal 1017.

The first global navigation satellite system (GNSS) analog-to-digital converter (ADC) 1055 may convert the 4Rx inphase/quadrature (I/Q) signal 1018 to a digital signal. The digital signal may be passed through the first baseband processor 1057a to the global navigation satellite system (GNSS) controller 1059.

The wireless wide area network (WWAN) analog-to-digital converter (ADC) 1069 may convert the 5Rx inphase/quadrature (I/Q) signal 1017 to a digital signal. The wireless wide area network (WWAN) analog-to-digital converter (ADC) 1069 may use the same clock as the global navigation satellite system (GNSS) analog-to-digital converter (ADC) 1055 or the wireless wide area network (WWAN) analog-to-digital converter (ADC) 1069 may use a standard wireless wide area network (WWAN) analog-to-digital converter (ADC) clock.

The output of the wireless wide area network (WWAN) analog-to-digital converter (ADC) 1069 may be passed through the wireless wide area network (WWAN) digital front end (DFE) 1071 and stored in the wireless wide area network (WWAN) sample memory 1073. The output of the wireless wide area network (WWAN) analog-to-digital converter (ADC) 1069 may also be passed through the second baseband processor 1057b and be provided to the global navigation satellite system (GNSS) controller 1059.

In this configuration, the die size may remain the same because no additional components are required compared to known baseband digital modem configurations. However, in this configuration, the wireless wide area network (WWAN) analog-to-digital converter (ADC) 1069 may consume more power than the second global navigation satellite system (GNSS) analog-to-digital converter (ADC) 955b described in connection with FIG. 9.

Figure 11:
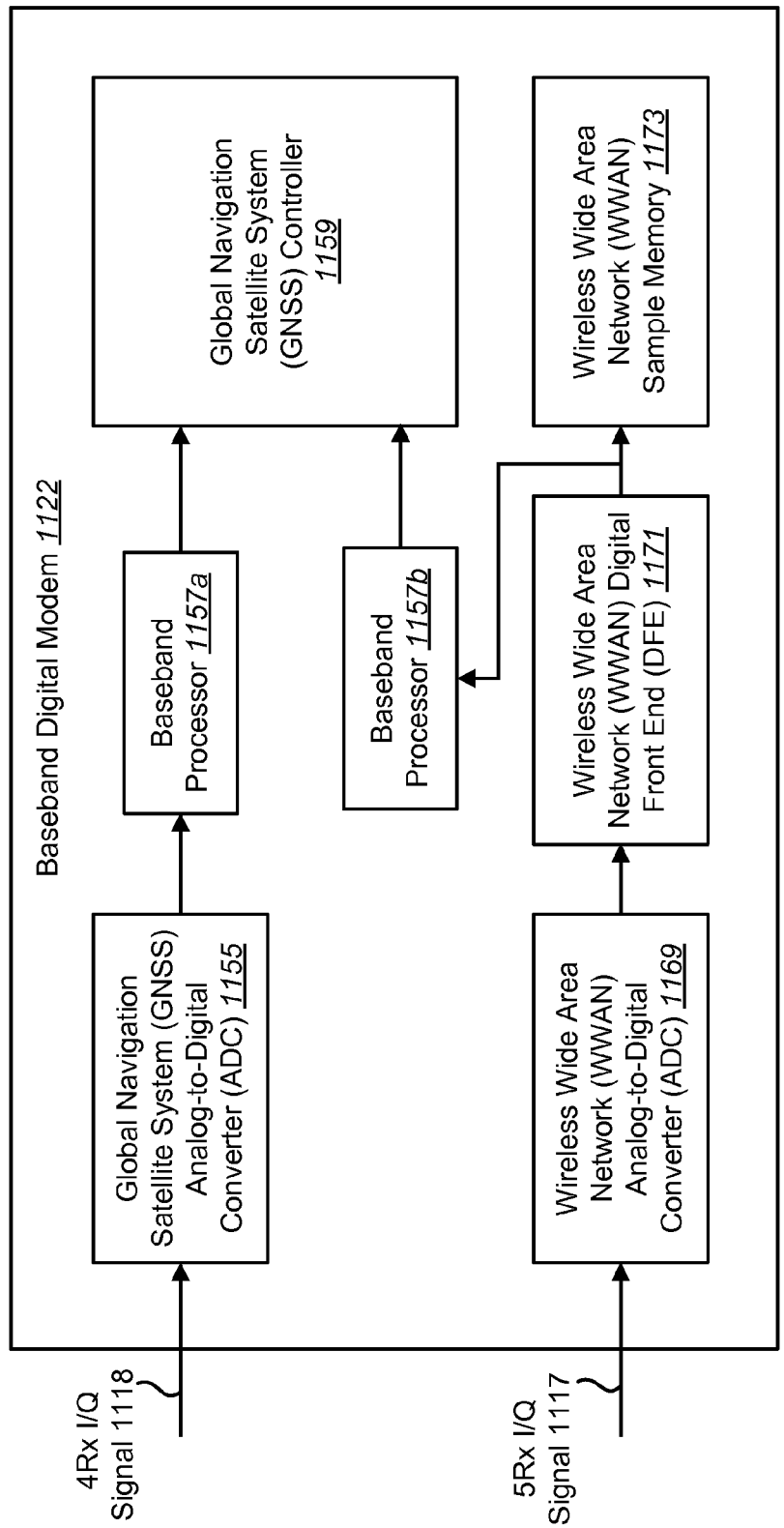
FIG. 11 is a block diagram illustrating yet another configuration of a baseband digital modem used for secondary (e.g., global navigation satellite system (GNSS)) diversity.

FIG. 11 is a block diagram illustrating yet another configuration of a baseband digital modem 1122 used for secondary (e.g., global navigation satellite system (GNSS)) diversity. The baseband digital modem 1122 may be one configurations of the baseband digital modem 122 described in connection with FIG. 1. The baseband digital modem 1122 may be include a global navigation satellite system (GNSS) analog-to-digital converter (ADC) 1155, a first baseband processor 1157a, a global navigation satellite system (GNSS) controller 1159, a second baseband processor 1157b, a wireless wide area network (WWAN) analog-to-digital converter (ADC) 1169, a wireless wide area network (WWAN) digital front end (DFE) 1171 and a wireless wide area network (WWAN) sample memory 1173. The baseband digital modem 1122 may also receive inputs from the 4Rx inphase/quadrature (I/Q) signal 1118 and the 5Rx inphase/quadrature (I/Q) signal 1117.

The first global navigation satellite system (GNSS) analog-to-digital converter (ADC) 1155 may convert the 4Rx inphase/quadrature (I/Q) signal 1118 from an analog signal and may output a first digital signal. The first digital signal may pass through the first baseband processor 1157a and into the global navigation satellite system (GNSS) controller 1159.

The wireless wide area network (WWAN) analog-to-digital converter (ADC) 1169 may convert the 5Rx inphase/quadrature (I/Q) signal 1117 to a second digital signal. The second digital signal may pass through the wireless wide area network (WWAN) digital front end (DFE) 1171 and be stored in wireless wide area network (WWAN) sample memory 1173. Additionally, the second digital signal may pass through the wireless wide area network (WWAN) digital front end (DFE) 1171 and the second baseband processor 1157b before being input into the global navigation satellite system (GNSS) controller 1159.

In this configuration, the existing components may be reused, such as the wireless wide area network (WWAN) digital front end (DFE) 1171. For example, the gain control and the DC offset from the wireless wide area network (WWAN) radio frequency (RF) diver stack of the wireless wide area network (WWAN) digital front end (DFE) 1171 may be reused. Additionally, larger signals, such as NextNav, may be handled. However, this configuration may consume more power than the second global navigation satellite system (GNSS) analog-to-digital converter (ADC) 955b described in connection with FIG. 9.

Figure 12:
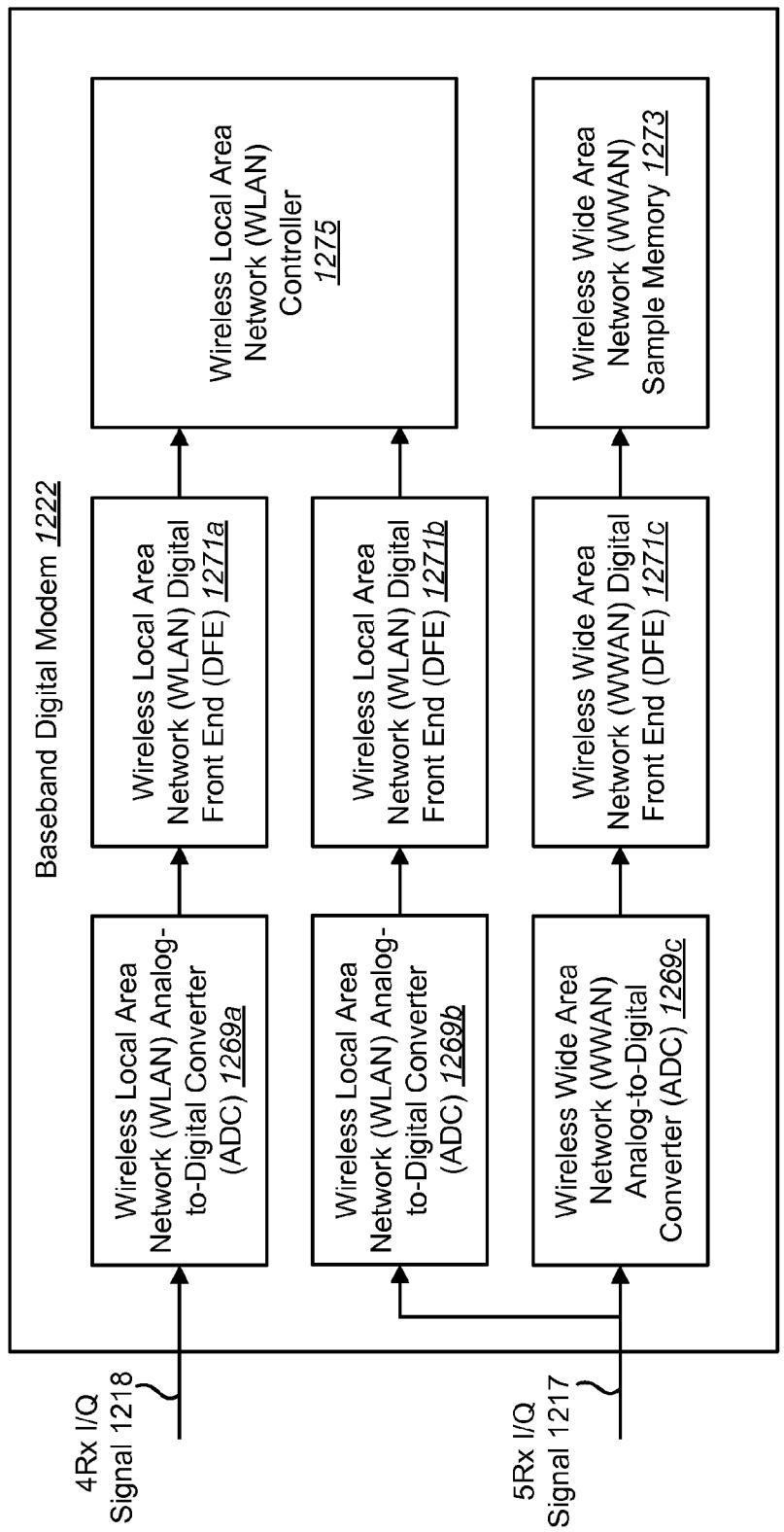
FIG. 12 is a block diagram illustrating one configuration of a baseband digital modem used for secondary (e.g., wireless wide area network (WWAN)) diversity.

FIG. 12 is a block diagram illustrating one configuration of a baseband digital modem 1222 used for secondary (e.g., wireless local area network (WLAN)) diversity. The baseband digital modem 1222 may be part of the transceiver chip 310 or a separate component from the transceiver chip 310. The baseband digital modem 1222 may be one configurations of the baseband digital modem described in connection with the baseband digital modem 122 of FIG. 1.

The baseband digital modem 1222 may include a first wireless local area network (WLAN) analog-to-digital converter (ADC) 1269a, a second wireless local area network (WLAN) analog-to-digital converter (ADC) 1269b, a wireless wide area network (WWAN) analog-to-digital converter (ADC) 1269c, a first wireless local area network (WLAN) digital front end (DFE) 1271a, a second wireless local area network (WLAN) digital front end (DFE) 1271b, a wireless wide area network (WWAN) digital front end (DFE) 1271c, a wireless local area network (WLAN) controller 1275 and a wireless wide area network (WWAN) sample memory 1273. The baseband digital modem 1222 may receive a 4Rx inphase/quadrature (I/Q) signal 1218 and a 5Rx inphase/quadrature (I/Q) signal 1219. The wireless local area network (WLAN) controller 1275 may employ multiple digital signals to obtain a more accurate determination of the wireless communication device 104.

The first wireless local area network (WLAN) analog-to-digital converter (ADC) 1269a may receive the 4Rx I/Q signal 1218. The first wireless local area network (WLAN) analog-to-digital converter (ADC) 1269a may convert the 4Rx inphase/quadrature (I/Q) signal 1218 from an analog signal to a digital signal. The digital signal may pass through the first wireless local area network (WLAN) digital front end (DFE) 1271a and into the wireless local area network (WLAN) controller 1275. The wireless local area network (WLAN) controller 1275 may obtain data for the wireless communication device 104 based on the digital signal.

The 5Rx inphase/quadrature (I/Q) signal 1219 may be passed through the second wireless local area network (WLAN) analog-to-digital converter (ADC) 1269b to obtain a digital signal. The digital signal may be passed through the second wireless local area network (WLAN) digital front end (DFE) 1271b before being input into the wireless local area network (WLAN) controller 1275. By obtaining multiple secondary signals (e.g., wireless local area network (WLAN)), the wireless local area network (WLAN) controller 1275 may have improved accuracy.

The 5Rx inphase/quadrature (I/Q) signal 1219 may also be provided to the wireless wide area network (WWAN) analog-to-digital converter (ADC) 1269c. The output of the wireless wide area network (WWAN) analog-to-digital converter (ADC) 1269c may be passed through the wireless wide area network (WWAN) digital front end (DFE) 1271c and stored in the wireless wide area network (WWAN) sample memory 1273. The second wireless local area network (WLAN) analog-to-digital converter (ADC) 1269b and the wireless wide area network (WWAN) analog-to-digital converter (ADC) 1269c may share pins for the 5Rx inphase/quadrature (I/Q) signal 1219.

Figure 13:
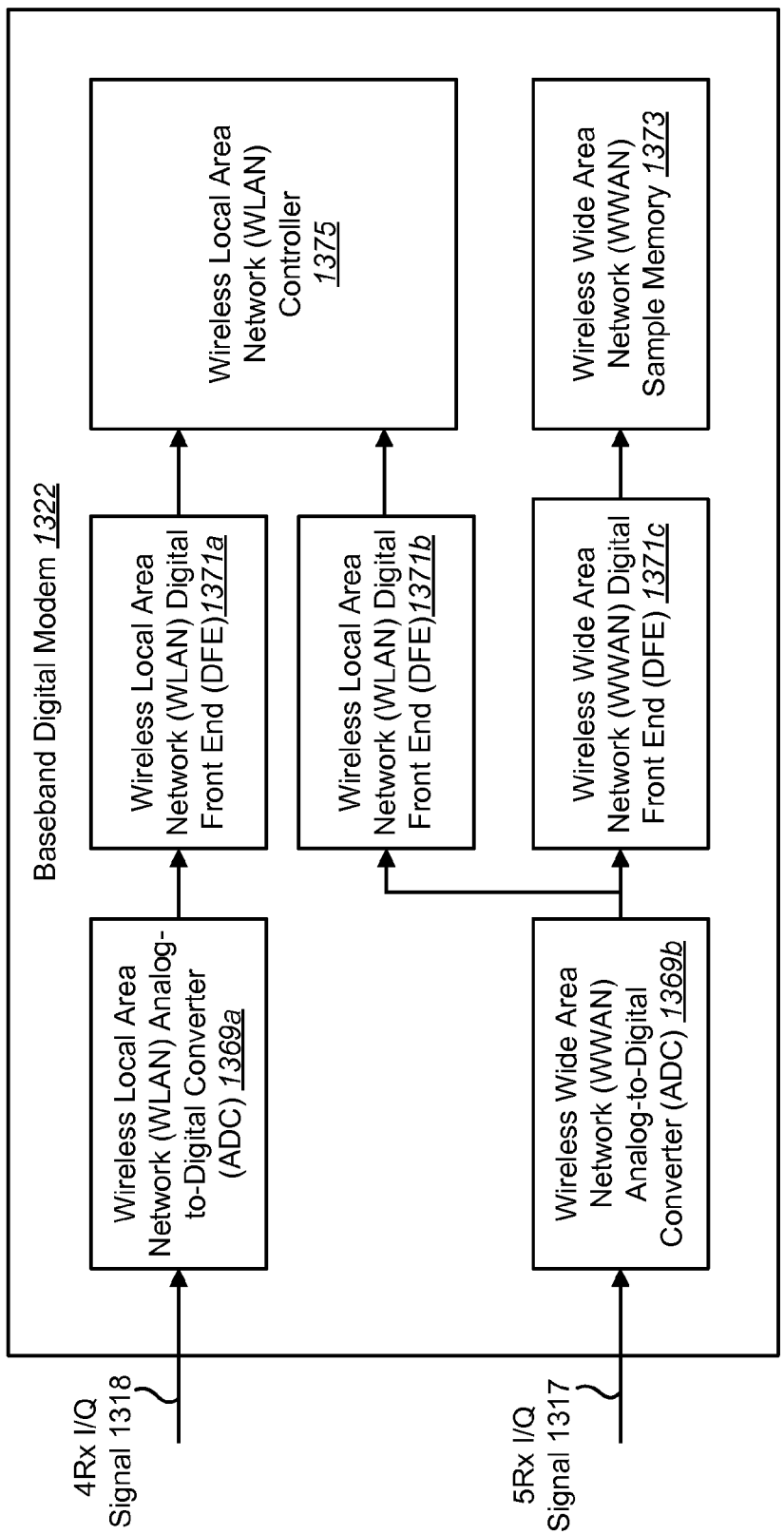
FIG. 13 is a block diagram illustrating another configuration of a baseband digital modem used for secondary (e.g., wireless wide area network (WWAN)) diversity.

FIG. 13 is a block diagram illustrating another configuration of a baseband digital modem 1322 used for secondary (e.g., wireless local area network (WLAN)) diversity. The baseband digital modem 1322 may be one configurations of the baseband digital modem 112 described in connection with FIG. 1.

The baseband digital modem 1322 may include a first wireless local area network (WLAN) analog-to-digital converter (ADC) 1369a, a wireless wide area network (WWAN) analog-to-digital converter (ADC) 1369b, a first wireless local area network (WLAN) digital front end (DFE) 1371a, a second wireless local area network (WLAN) digital front end (DFE) 1371b, a wireless wide area network (WWAN) digital front end (DFE) 1371c, a wireless local area network (WLAN) controller 1375 and a wireless wide area network (WWAN) sample memory 1373. The baseband digital modem 1322 may receive a 4Rx inphase/quadrature (I/Q) signal 1318 and a 5Rx inphase/quadrature (I/Q) signal 1319.

The first wireless local area network (WLAN) analog-to-digital converter (ADC) 1369a may convert the 4Rx inphase/quadrature (I/Q) signal 1318 to a digital signal. The digital signal may be passed through the first wireless local area network (WLAN) digital front end (DFE) 1371a to the wireless local area network (WLAN) controller 1375.

The wireless wide area network (WWAN) analog-to-digital converter (ADC) 1369b may convert the 5Rx inphase/quadrature (I/Q) signal 1319 to a digital signal. In some configurations, the wireless wide area network (WWAN) analog-to-digital converter (ADC) 1369b may use the same clock as the first wireless local area network (WLAN) analog-to-digital converter (ADC) 1369a.

The output of the wireless wide area network (WWAN) analog-to-digital converter (ADC) 1369b may be passed through the second wireless local area network (WLAN) digital front end (DFE) 1371b and be provided to the wireless local area network (WLAN) controller 1375. The output of the wireless wide area network (WWAN) analog-to-digital converter (ADC) 1369b may also be passed through the wireless wide area network (WWAN) digital front end (DFE) 1371c and stored in the wireless wide area network (WWAN) sample memory 1373. However, while the baseband digital modem 1322 of FIG. 13 may require less elements than the baseband digital modem 1222 described in connection with FIG. 12, the baseband digital modem 1322 of FIG. 13 may consume more power than the baseband digital modem 1222 described in connection with FIG. 12.

Figure 14:
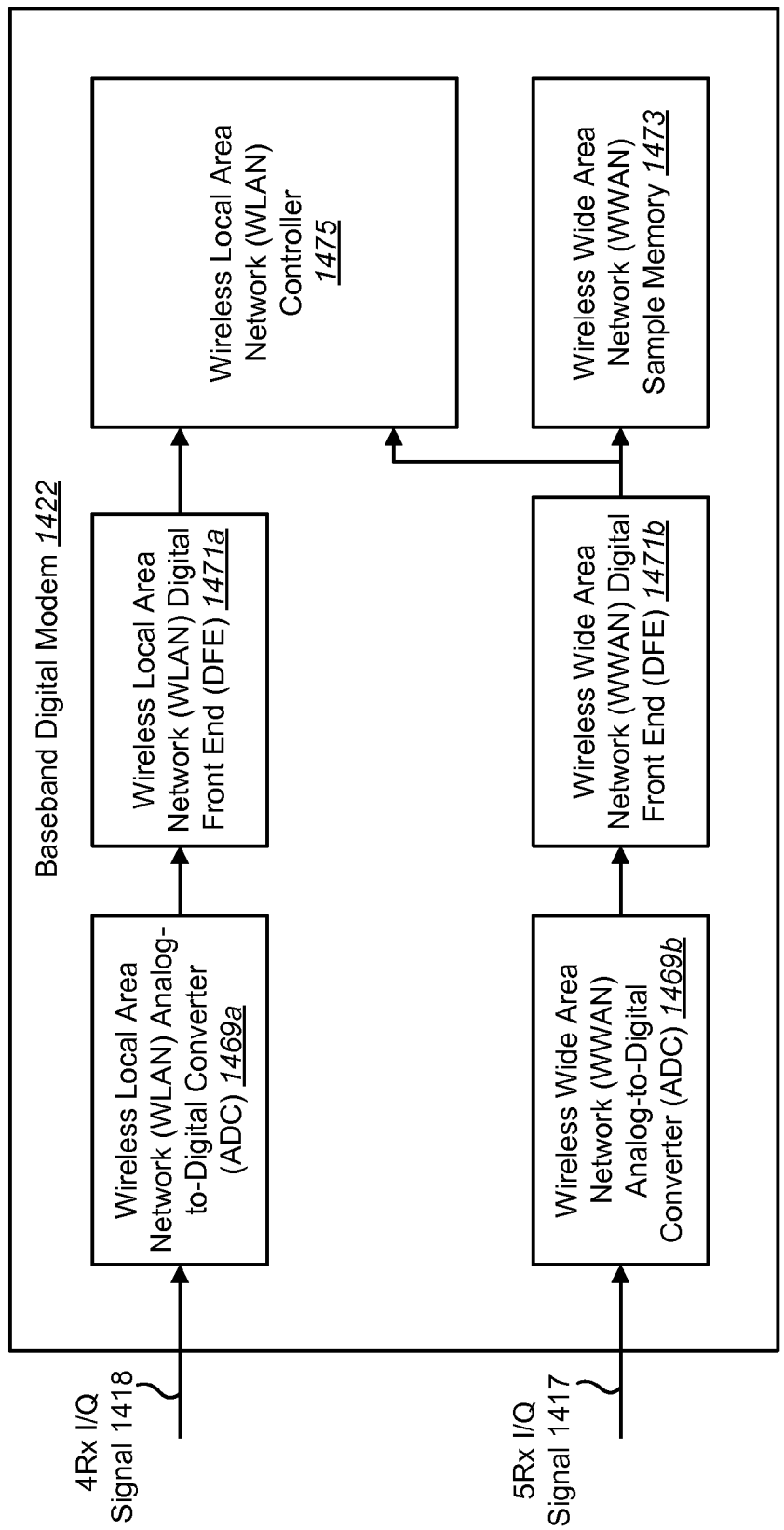
FIG. 14 is a block diagram illustrating yet another configuration of a baseband digital modem used for secondary (e.g., wireless wide area network (WWAN)) diversity.

FIG. 14 is a block diagram illustrating yet another configuration of a baseband digital modem 1422 used for secondary (e.g., wireless local area network (WLAN)) diversity. The baseband digital modem 1422 may be one configurations of the baseband digital modem 122 described in connection with FIG. 1.

The baseband digital modem 1422 may include a wireless local area network (WLAN) analog-to-digital converter (ADC) 1469a, a wireless wide area network (WWAN) analog-to-digital converter (ADC) 1469b, a wireless local area network (WLAN) digital front end (DFE) 1471a, a wireless wide area network (WWAN) digital front end (DFE) 1471b, a wireless local area network (WLAN) controller 1475 and a wireless wide area network (WWAN) sample memory 1473. The baseband digital modem 1422 may receive a 4Rx inphase/quadrature (I/Q) signal 1418 and a 5Rx inphase/quadrature (I/Q) signal 1419.

The wireless local area network (WLAN) analog-to-digital converter (ADC) 1469a may convert the 4Rx inphase/quadrature (I/Q) signal 1418 from an analog signal and may output a first digital signal. The first digital signal may pass through the wireless local area network (WLAN) digital front end (DFE) 1471 a and into the wireless local area network (WLAN) controller 1475.

The wireless wide area network (WWAN) analog-to-digital converter (ADC) 1469b may convert the 5Rx inphase/quadrature (I/Q) signal 1419 to a second digital signal. The second digital signal may pass through the wireless wide area network (WWAN) digital front end (DFE) 1471b before being input into the wireless local area network (WLAN) controller 1475. Additionally, the second digital signal may pass through the wireless wide area network (WWAN) digital front end (DFE) 1471b and be stored in wireless wide area network (WWAN) sample memory 1473.

In this configuration, the existing components may be reused, such as the wireless wide area network (WWAN) digital front end (DFE) 1471b. For example, the gain control and the DC offset from the wireless wide area network (WWAN) radio frequency (RF) diver stack of the wireless wide area network (WWAN) digital front end (DFE) 1471b may be reused. Additionally, larger signals may be handled. However, this configuration may consume more power than the baseband digital modem 1222 described in connection with FIG. 12.

Figure 15:
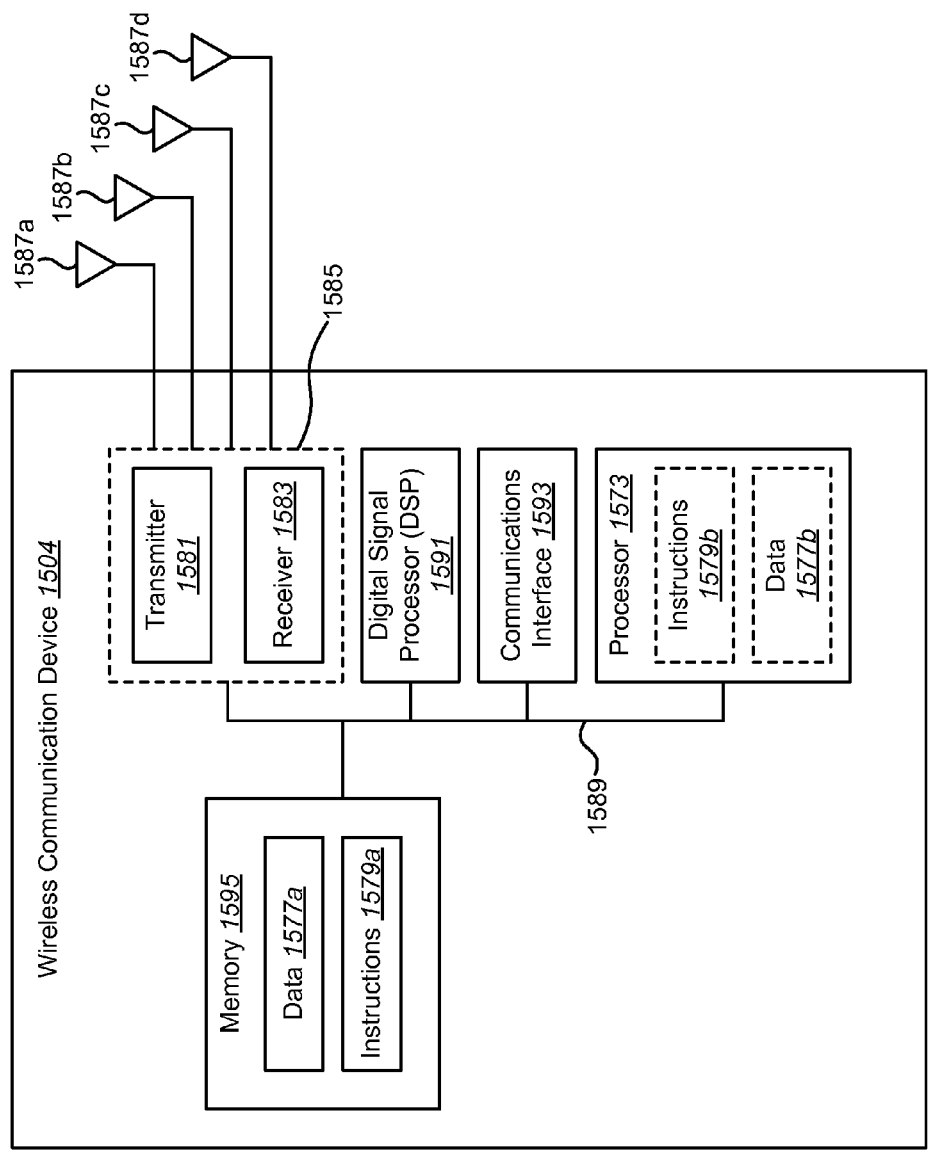
FIG. 15 illustrates certain components that may be included within a wireless communication device.

FIG. 15 illustrates certain components that may be included within a wireless communication device 1504. The wireless communication device 1504 may be an access terminal, a mobile station, a user equipment (UE), etc. The wireless communication device 1504 includes a processor 1573. The processor 1573 may be a general purpose single- or multi-chip microprocessor (e.g., an ARM), a special purpose microprocessor (e.g., a digital signal processor (DSP)), a microcontroller, a programmable gate array, etc. The processor 1573 may be referred to as a central processing unit (CPU). Although just a single processor 1573 is shown in the wireless communication device 1504 of FIG. 15, in an alternative configuration, a combination of processors (e.g., an ARM and DSP) could be used.

The wireless communication device 1504 also includes memory 1575. The memory 1595 may be any electronic component capable of storing electronic information. The memory 1595 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1577a and instructions 1579a may be stored in the memory 1595. The instructions 1579a may be executable by the processor 1573 to implement the methods disclosed herein. Executing the instructions 1579a may involve the use of the data 1577a that is stored in the memory 1595. When the processor 1573 executes the instructions 1579, various portions of the instructions 1579b may be loaded onto the processor 1573 and various pieces of data 1577b may be loaded onto the processor 1573.

The wireless communication device 1504 may also include a transmitter 1581 and a receiver 1583 to allow transmission and reception of signals to and from the wireless communication device 1504 via a first antenna 1587a, a second antenna 1587b, a third antenna 1587c and fourth antenna 1587d. The transmitter 1581 and receiver 1583 may be collectively referred to as a transceiver 1585. The wireless communication device 1504 may also include (not shown) multiple transmitters, additional antennas, multiple receivers and/or multiple transceivers.

The wireless communication device 1504 may include a digital signal processor (DSP) 1591. The wireless communication device 1504 may also include a communications interface 1593. The communications interface 1593 may allow a user to interact with the wireless communication device 1504.

The various components of the wireless communication device 1504 may be coupled together by one or more buses, which may include a power bus, a control signal bus, a status signal bus, a data bus, etc. For the sake of clarity, the various buses are illustrated in FIG. 15 as a bus system 1589.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 4, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A wireless communication device configured for receiving multiple signals, comprising:
a single-chip carrier aggregation receiver architecture that comprises:
a first antenna;
a second antenna;
a third antenna;
a fourth antenna; and
a transceiver chip, wherein the transceiver chip comprises multiple carrier aggregation receivers, and wherein the single-chip carrier aggregation receiver architecture reuses at least one of the carrier aggregation receivers for secondary diversity.

2. The wireless communication device of claim 1, wherein the multiple carrier aggregation receivers comprise:
a first receiver;
a second receiver;
a third receiver; and
a fourth receiver, and wherein the transceiver chip further comprises:
a transmitter; and
a fifth receiver.

3. The wireless communication device of claim 2, wherein the multiple carrier aggregation receivers each comprise multiple low noise amplifiers, and wherein the fifth receiver comprises multiple low noise amplifiers.

4. The wireless communication device of claim 2, wherein the fifth receiver is a non-carrier aggregation receiver.

5. The wireless communication device of claim 2, wherein the fifth receiver is a non-simultaneous hybrid dual receiver.

6. The wireless communication device of claim 2, wherein the fifth receiver is a global navigation satellite system receiver.

7. The wireless communication device of claim 2, wherein the fifth receiver is a Bluetooth receiver.

8. The wireless communication device of claim 2, wherein the fifth receiver is a Wi-Fi receiver.

9. The wireless communication device of claim 2, wherein a first secondary routing is used from the third antenna through the fourth receiver to obtain a fourth Rx inphase/quadrature signal, and wherein a second secondary routing is used from the fourth antenna through the fifth receiver to obtain a fifth Rx inphase/quadrature signal.

10. The wireless communication device of claim 9, wherein the first secondary routing passes through a first 4Rx low noise amplifier, and wherein the second secondary routing passes through a first 5Rx low noise amplifier and a second 5Rx low noise amplifier.

11. The wireless communication device of claim 9, wherein the first receiver comprises a first mixer, wherein the second receiver comprises a second mixer, wherein the third receiver comprises a third mixer, wherein the fourth receiver comprises a fourth mixer, and wherein the fifth receiver comprises a fifth mixer.

12. The wireless communication device of claim 11 wherein the first secondary routing passes through the fourth mixer.

13. The wireless communication device of claim 12, wherein the fourth mixer is driven by a voltage controlled oscillator on the second receiver.

14. The wireless communication device of claim 12, wherein the fourth mixer is driven by a voltage controlled oscillator on the fifth receiver.

15. The wireless communication device of claim 11, further comprising a sixth mixer on the fourth receiver, wherein the sixth mixer is driven by a voltage controlled oscillator on the fifth receiver.

16. The wireless communication device of claim 11, further comprising a sixth mixer on the fifth receiver, and wherein the sixth mixer is driven by a voltage controlled oscillator on the fifth receiver.

17. The wireless communication device of claim 9, wherein the first secondary routing passes through a first 5RX low noise amplifier, and wherein the second secondary routing passes through a second 5RX low noise amplifier.

18. The wireless communication device of claim 9, wherein the fourth Rx inphase/quadrature signal and the fifth Rx inphase/quadrature signal pass through a baseband digital modem.

19. The wireless communication device of claim 18, wherein the baseband digital modem comprises:
a first analog-to-digital converter;
a first baseband processor;
a controller;
a second analog-to-digital converter;
a digital front end; and
a sample memory.

20. The wireless communication device of claim 19, wherein the first analog-to-digital converter is a global navigation satellite system analog-to-digital converter, wherein the controller is a global navigation satellite system controller, wherein the second analog-to-digital converter is a wireless wideband area network analog-to-digital converter, wherein the digital front end is a wireless wideband area network digital front end, and wherein the sample memory is a wideband area network sample memory.

21. The wireless communication device of claim 19, wherein the fourth Rx inphase/quadrature signal passes through the first analog-to-digital converter, the first baseband processor and the controller, wherein the fifth Rx inphase/quadrature signal passes through the second analog-to-digital converter, the digital front end and the sample memory, and wherein the fifth Rx inphase/quadrature signal passes through a third analog-to-digital converter, a second baseband processor and the controller.

22. The wireless communication device of claim 21, wherein the third analog-to-digital converter is a global navigation satellite system analog-to-digital converter.

23. The wireless communication device of claim 19, wherein the fourth Rx inphase/quadrature signal passes through the first analog-to-digital converter, the first baseband processor and the controller, wherein the fifth Rx inphase/quadrature signal passes through the second analog-to-digital converter, the digital front end and the sample memory, and wherein the fifth Rx inphase/quadrature signal passes through the second analog-to-digital converter, a second baseband processor and the controller.

24. The wireless communication device of claim 19, wherein the fourth Rx inphase/quadrature signal passes through the first analog-to-digital converter, the first baseband processor and the controller, wherein the fifth Rx inphase/quadrature signal passes through the second analog-to-digital converter, the digital front end and the sample memory, and wherein the fifth Rx inphase/quadrature signal passes through the second analog-to-digital converter, the digital front end, a second baseband processor and the controller.

25. The wireless communication device of claim 18, wherein the baseband digital modem comprises:
  a first analog-to-digital converter;
  a first digital front end;
  a controller;
  a second analog-to-digital converter;
  a second digital front end; and
  a sample memory.

26. The wireless communication device of claim 25, wherein the first analog-to-digital converter is a wireless local area network analog-to-digital converter, wherein the first digital front end is a wireless local area network digital front end, wherein the controller is a wireless local area network controller, wherein the second analog-to-digital converter is a wireless wide area network analog-to-digital converter, wherein the second digital front end is a wireless wide area network digital front end, and wherein the sample memory is a wide area network sample memory.

27. The wireless communication device of claim 25, wherein the fourth Rx inphase/quadrature signal passes through the first analog-to-digital converter, the first digital front end and the controller, wherein the fifth Rx inphase/quadrature signal passes through the second analog-to-digital converter, the second digital front end and the sample memory, and wherein the fifth Rx inphase/quadrature signal passes through a third analog-to-digital converter, a third digital front end and the controller.

28. The wireless communication device of claim 25, wherein the fourth Rx inphase/quadrature signal passes through the first analog-to-digital converter, the first digital front end and the controller, wherein the fifth Rx inphase/quadrature signal passes through the second analog-to-digital converter, the second digital front end and the sample memory, and wherein the fifth Rx inphase/quadrature signal passes through the second analog-to-digital converter, a third digital front end and the controller.

29. The wireless communication device of claim 25, wherein the fourth Rx inphase/quadrature signal passes through the first analog-to-digital converter, the first digital front end and the controller, wherein the fifth Rx inphase/quadrature signal passes through the second analog-to-digital converter, the second digital front end and the sample memory, and wherein the fifth Rx inphase/quadrature signal passes through the second analog-to-digital converter, the second digital front end and the controller.

30. A method for receiving multiple signals using a single-chip carrier aggregation receiver architecture that comprises a first antenna, a second antenna, a third antenna and a fourth antenna, the method comprising:
  receiving a first secondary signal using the third antenna;
  routing the first secondary signal through a fourth receiver on a transceiver chip in the single-chip carrier aggregation receiver architecture, wherein the fourth receiver is one of multiple carrier aggregation receivers, and wherein the fourth receiver is reused for secondary diversity;
  receiving a second secondary signal using the fourth antenna; and
  routing the second secondary signal through a fifth receiver on the transceiver chip in the single-chip carrier aggregation receiver architecture.

31. The method of claim 30, wherein the first secondary signal routing is used to obtain a fourth Rx inphase/quadrature signal, and wherein the second secondary signal routing is used to obtain a fifth Rx inphase/quadrature signal.

32. The method of claim 30, wherein the fifth receiver is a non-carrier aggregation receiver.

33. The method of claim 30, wherein the fifth receiver is a non-simultaneous hybrid dual receiver.

34. The method of claim 30, wherein the fifth receiver is a global navigation satellite system receiver.

35. The method of claim 30, wherein the fifth receiver is a Bluetooth receiver.

36. The method of claim 30, wherein the fifth receiver is a Wi-Fi receiver.

37. The method of claim 30, wherein the first secondary signal is further routed through a first 4RX low noise amplifier, and wherein the second secondary signal is further routed through a first 5RX low noise amplifier and a second 5RX low noise amplifier.

38. The method of claim 30, wherein the multiple carrier aggregation receivers comprise:
  a first receiver;
  a second receiver;
  a third receiver; and
  the fourth receiver.

39. The method of claim 38, wherein the multiple carrier aggregation receivers each comprise multiple low noise amplifiers, and wherein the fifth receiver comprises multiple low noise amplifiers.

40. The method of claim 38, wherein the multiple carrier aggregation receivers comprise:
  a first mixer on the first receiver;
  a second mixer on the second receiver;
  a third mixer on the third carrier; and
  a fourth mixer on the fourth receiver, and wherein the fifth receiver comprises a fifth mixer.

41. The method of claim 40 wherein the first secondary signal is further routed through the fourth mixer.

42. The method of claim 41, wherein the fourth mixer is driven by a voltage controlled oscillator on the second receiver.

43. The method of claim 41, wherein the fourth mixer is driven by a voltage controlled oscillator on the fifth receiver.

44. The method of claim 40, wherein the transceiver chip further comprises a sixth mixer on the fourth receiver, and wherein the sixth mixer is driven by a voltage controlled oscillator on the fifth receiver.

45. The method of claim 40, wherein the transceiver chip further comprises a sixth mixer on the fifth receiver, and wherein the sixth mixer is driven by a voltage controlled oscillator on the fifth receiver.

46. The method of claim 30, wherein the first secondary signal is routed through a first 5RX low noise amplifier, and wherein the second secondary signal is routed through a second 5RX low noise amplifier.

47. The method of claim 31, wherein the fourth Rx inphase/quadrature signal and the fifth Rx inphase/quadrature signal pass through a baseband digital modem.

48. The method of claim 47, wherein the baseband digital modem comprises:
  a first analog-to-digital converter;
  a first baseband processor;
  a controller;
  a second analog-to-digital converter;
  a digital front end; and
  a sample memory.

49. The method of claim 48, wherein the first analog-to-digital converter is a global navigation satellite system analog-to-digital converter, wherein the controller is a global navigation satellite system controller, wherein the second analog-to-digital converter is a wireless wideband area network analog-to-digital converter, wherein the digital front end is a wireless wideband area network digital front end, and wherein the sample memory is a wideband area network sample memory.

50. The method of claim 48, wherein the fourth Rx inphase/quadrature signal further passes through the first analog-to-digital converter, the first baseband processor, and the controller, wherein the fifth Rx inphase/quadrature signal further passes through the second analog-to-digital converter, the digital front end, and the sample memory, and wherein the fifth Rx inphase/quadrature signal further passes through a third analog-to-digital converter, a second baseband processor, and the controller.

51. The method of claim 50, wherein the third analog-to-digital converter is a global navigation satellite system analog-to-digital converter.

52. The method of claim 48, wherein the fourth Rx inphase/quadrature signal further passes through the first analog-to-digital converter, the first baseband processor, and the controller, wherein the fifth Rx inphase/quadrature signal further passes through the second analog-to-digital converter, the digital front end, and the sample memory, and wherein the fifth Rx inphase/quadrature signal further passes through the second analog-to-digital converter, a second baseband processor, and the controller.

53. The method of claim 48, wherein the fourth Rx inphase/quadrature signal further passes through the first analog-to-digital converter, the first baseband processor, and the controller, wherein the fifth Rx inphase/quadrature signal further passes through the second analog-to-digital converter, the digital front end, and the sample memory, and wherein the fifth Rx inphase/quadrature signal further passes through the second analog-to-digital converter, the digital front end, a second baseband processor, and the controller.

54. The method of claim 47, wherein the baseband digital modem comprises:
 a first analog-to-digital converter;
 a first digital front end;
 a controller;
 a second analog-to-digital converter;
 a second digital front end; and
 a sample memory.

55. The method of claim 54, wherein the first analog-to-digital converter is a wireless local area network analog-to-digital converter, wherein the first digital front end is a wireless local area network digital front end, wherein the controller is a wireless local area network controller, wherein the second analog-to-digital converter is a wireless wide area network analog-to-digital converter, wherein the second digital front end is a wireless wide area network digital front end, and wherein the sample memory is a wide area network sample memory.

56. The method of claim 54, wherein the fourth Rx inphase/quadrature signal passes through the first analog-to-digital converter, the first digital front end and the controller, wherein the fifth Rx inphase/quadrature signal passes through the second analog-to-digital converter, the second digital front end and the sample memory, and wherein the fifth Rx inphase/quadrature signal passes through a third analog-to-digital converter, a third digital front end and the controller.

57. The method of claim 54, wherein the fourth Rx inphase/quadrature signal passes through the first analog-to-digital converter, the first digital front end and the controller, wherein the fifth Rx inphase/quadrature signal passes through the second analog-to-digital converter, the second digital front end and the sample memory, and wherein the fifth Rx inphase/quadrature signal passes through the second analog-to-digital converter, a third digital front end and the controller.

58. The method of claim 54, wherein the fourth Rx inphase/quadrature signal passes through the first analog-to-digital converter, the first digital front end and the controller, wherein the fifth Rx inphase/quadrature signal passes through the second analog-to-digital converter, the second digital front end and the sample memory, and wherein the fifth Rx inphase/quadrature signal passes through the second analog-to-digital converter, the second digital front end and the controller.

59. A computer-program product for receiving multiple signals using a single-chip carrier aggregation receiver architecture that comprises a first antenna, a second antenna, a third antenna and a fourth antenna, the computer-program product comprising a non-transitory computer-readable medium having instructions thereon, the instructions comprising:
 code for causing a wireless communication device to receive a first secondary signal using the third antenna;
 code for causing the wireless communication device to route the first secondary signal through a fourth receiver on a transceiver chip in the single-chip carrier aggregation receiver architecture, wherein the fourth receiver is one of multiple carrier aggregation receivers, and wherein the fourth receiver is reused for secondary diversity;
 code for causing the wireless communication device to receive a second secondary signal using the fourth antenna; and
 code for causing the wireless communication device to route the second secondary signal through a fifth receiver on the transceiver chip in the single-chip carrier aggregation receiver architecture.

60. The computer-program product of claim 59, wherein the first secondary signal routing is used to obtain a fourth Rx inphase/quadrature signal, and wherein the second secondary signal routing is used to obtain a fifth Rx inphase/quadrature signal.

61. An apparatus for receiving multiple signals using a single-chip carrier aggregation receiver architecture that comprises a first antenna, a second antenna, a third antenna and a fourth antenna, comprising:
 means for receiving a first secondary signal using the third antenna;
 means for routing the first secondary signal through a fourth receiver on a transceiver chip in the single-chip carrier aggregation receiver architecture, wherein the fourth receiver is one of multiple carrier aggregation receivers, and wherein the fourth receiver is reused for secondary diversity;
 means for receiving a second secondary signal using the fourth antenna; and
 means for routing the second secondary signal through a fifth receiver on the transceiver chip in the single-chip carrier aggregation receiver architecture.

62. The apparatus of claim 61, wherein the first secondary signal routing is used to obtain a fourth Rx inphase/quadrature signal, and wherein the second secondary signal routing is used to obtain a fifth Rx inphase/quadrature signal.

* * * * *